United States Patent
Souchard

(10) Patent No.: US 9,530,220 B2
(45) Date of Patent: Dec. 27, 2016

(54) SPATIAL AND TEMPORAL ALIGNMENT OF VIDEO SEQUENCES

(75) Inventor: Christophe Souchard, Marina Del Rey, CA (US)

(73) Assignee: APPLE INC., Cupertino, CA (US)

( * ) Notice: Subject to any disclaimer, the term of this patent is extended or adjusted under 35 U.S.C. 154(b) by 1458 days.

(21) Appl. No.: 13/013,802

(22) Filed: Jan. 25, 2011

(65) Prior Publication Data

US 2011/0116767 A1 May 19, 2011

Related U.S. Application Data

(62) Division of application No. 11/266,101, filed on Nov. 2, 2005, now Pat. No. 7,912,337.

(51) Int. Cl.
| | |
|---|---|
| H04N 5/93 | (2006.01) |
| G11B 27/00 | (2006.01) |
| G06T 7/20 | (2006.01) |
| G06K 9/00 | (2006.01) |
| G06K 9/32 | (2006.01) |

(52) U.S. Cl.
CPC ............. *G06T 7/20* (2013.01); *G06K 9/00711* (2013.01); *G06K 9/32* (2013.01)

(58) Field of Classification Search
USPC ........................................ 386/278, 280, 284
See application file for complete search history.

(56) References Cited

U.S. PATENT DOCUMENTS

| | | |
|---|---|---|
| 4,647,975 A | 3/1987 | Alston et al. |
| 5,144,442 A | 9/1992 | Ginosar et al. |
| 5,325,449 A | 6/1994 | Burt et al. |
| 5,627,905 A | 5/1997 | Sebok et al. |
| 5,828,793 A | 10/1998 | Mann |
| 6,104,441 A | 8/2000 | Wee et al. |
| 6,266,103 B1 | 7/2001 | Barton et al. |

(Continued)

OTHER PUBLICATIONS

U.S. Appl. No. 11/107,327, filed Apr. 16, 2005, Souchard, Christophe.

(Continued)

*Primary Examiner* — Nigar Chowdhury
(74) *Attorney, Agent, or Firm* — Adeli LLP

(57) ABSTRACT

Some embodiments allow a video editor to spatially and temporally align two or more video sequences into a single video sequence. As used in this application, a video sequence is a set of images (e.g., a set of video frames or fields). A video sequence can be from any media, such as broadcast media or recording media (e.g., camera, film, DVD, etc.). Some embodiments are implemented in a video editing application that has a user selectable alignment operation, which when selected aligns two or more video sequences. In some embodiments, the alignment operation identifies a set of pixels in one image (i.e., a "first" image) of a first video sequence and another image (i.e., a "second" image) of a second video sequence. The alignment operation defines a motion function that describes the motion of the set of pixels between the first and second images. The operation then defines an objective function based on the motion function. The operation finds an optimal solution for the objective function. Based on the objective function, the operation identifies a transform, which it then applies to the first image in order to align the first image with the second image.

20 Claims, 24 Drawing Sheets

(56) References Cited

U.S. PATENT DOCUMENTS

| | | | |
|---|---|---|---|
| 6,459,822 B1 | 10/2002 | Hathaway et al. | |
| 6,535,650 B1 | 3/2003 | Poulo et al. | |
| 6,549,643 B1 | 4/2003 | Toklu et al. | |
| 6,900,840 B1 | 5/2005 | Schinner et al. | |
| 7,023,913 B1 | 4/2006 | Monroe | |
| 7,280,753 B2 | 10/2007 | Oya et al. | |
| 7,602,401 B2 | 10/2009 | Nishida et al. | |
| 7,626,614 B1 | 12/2009 | Marcu | |
| 7,912,337 B2 | 3/2011 | Souchard | |
| 7,978,925 B1 | 7/2011 | Souchard | |
| 2001/0010555 A1 | 8/2001 | Driscoll, Jr. | |
| 2003/0043293 A1* | 3/2003 | Kawakami | 348/371 |
| 2003/0090593 A1 | 5/2003 | Xiong | |
| 2004/0085340 A1 | 5/2004 | Dimitrova et al. | |
| 2004/0114799 A1 | 6/2004 | Xu | |
| 2004/0240562 A1 | 12/2004 | Bargeron et al. | |
| 2005/0041883 A1 | 2/2005 | Maurer et al. | |
| 2005/0057650 A1* | 3/2005 | Kogane et al. | 348/143 |
| 2006/0177150 A1 | 8/2006 | Uyttendaele et al. | |
| 2007/0024742 A1 | 2/2007 | Raskar et al. | |
| 2009/0202176 A1 | 8/2009 | Hwang et al. | |
| 2010/0021048 A1 | 1/2010 | Zandifar et al. | |
| 2010/0157078 A1 | 6/2010 | Atanassov et al. | |
| 2011/0311202 A1 | 12/2011 | Souchard | |
| 2012/0002082 A1 | 1/2012 | Johnson et al. | |
| 2012/0002898 A1 | 1/2012 | Cote et al. | |
| 2012/0002899 A1 | 1/2012 | Orr, IV et al. | |

OTHER PUBLICATIONS

Portions of prosecution history of 11/107,327, Feb. 22, 2011, Souchard, Christophe.

Portions of prosecution history of U.S. Appl. No. 11/266,101, Feb. 15, 2011, Souchard, Christophe.

Debevec, Paul E., et al., "Recovering High Dynamic Range Radiance Maps from Photographs", Month Unknown, 1997, pp. 369-378, ACM Press/Addison-Wesley Publishing Co., New York, NY.

Kimia, Benjamin B., et al., "Geometric Heat Equation and Nonlinear Diffusion of Shapes and Images", Computer Vision and Pattern Recognition 1994, Proceedings CVPR '94, 1994 IEEE Computer Society Conference on Jun. 21-23, 1994, pp. 113-120.

Liang, Yu-Ming, et al., "Stabilizing Image Sequences Taken by the Camcorder Mounted on a Moving Vehicle", Proceedings of IEEE 6th International Conference on Intelligent Transportation Systems, Oct. 2003, pp. 90-95, vol. 1, Shanghai, China.

Ward, Greg, "Fast, Robust Image Registration for Compositing High Dynamic Range Photographs from Handheld Exposures", Journal of Graphics Tools 8.2, 2003, Month Unknown, pp. 17-30, A K Peters, LTD, Natick, MA.

Cerman, Lukas, "High Dynamic Range Images for Multiple Exposures," Diploma Thesis, Jan. 26, 2006, pp. 1-52, Prague, Czech Republic.

Granados, Miguel, et al., "Optimal HDR Reconstruction with Linear Digital Cameras," Proceedings of the IEEE Conference on Computer Vision and Pattern Recognition, Jun. 13-18, 2010, pp. 215-222, New Jersey, USA.

Mann, S., et al., "On Being 'Undigital' with Digital Cameras: Extending Dynamic Range by Combining Differently Exposed Pictures," Imaging Science and Technologies $48^{th}$ Annual Conference Proceedings, May 1, 1995, pp. 442-448.

Mann, Steve, "Compositing Multiple Pictures of the Same Scene," Proceedings of the $46^{th}$ Annual Imaging Science & Technology Conference, May 9-14, 1993, pp. 1-4, Massachusetts Institute of Technology, Cambridge, USA.

Petschnigg, Georg, et al., "Digital Photography with Flash and No-Flash Image Pairs," Proceedings of the ACM SIGGRAPH, Aug. 8, 2004, pp. 664-672, ACM, New York, USA.

Menzel, Nicolas, et al., "Freehand HDR photography with motion compensation," Proceedings of Vision, Modeling, and Visualization (VMV), Month Unknown, 2007, 7 pages.

Thevenaz, Philippe, et al., "A Pyramid Approach to Subpixel Registration Based on Intensity," IEEE Transactions on Image Processing, vol. 7, No. 1, Jan. 1998, pp. 27-41, IEEE.

Tomaszewska, Anna, et al., "Image Registration for Multi-exposure High Dynamic Range Image Acquisition," Proceedings of International Conference in Central Europe on Computer Graphics, Visualization and Computer Vision, Month Unknown, 2007, 8 pages.

\* cited by examiner

SPATIAL AND TEMPORAL ALIGNMENT OF VIDEO SEQUENCES

CLAIM OF BENEFIT TO PRIOR APPLICATIONS

This application is a divisional application of U.S. patent application Ser. No. 11/266,101, filed Nov. 2, 2005, now U.S. Pat. No. 7,912,337, now published as U.S. Publication 2007/0097266. U.S. Publication 2007/0097266 is incorporated herein by reference.

BACKGROUND OF THE INVENTION

High quality video photography and digital video photography equipments are increasingly accessible to a broad range of businesses and individuals, from movie production studios to average consumers. Many of these equipments are not capable of recording wide angle video footages (i.e., panoramic video footages). Wide angle video footages are advantageous over normal angle video footages because they include more visual detail than normal video footages. However, those equipments that are capable of recording wide angle video footages are often very expensive. Thus, the recording of wide angle video footage is economically not practical for many users.

Therefore, there is a need in the art for a practical and economical method for recording and/or producing wide angle video footages. Ideally, such a method can be performed by a video editing application that can align two or more video footages to produce a wide angle video footage, even when the two or more recorded video sequences were recorded at different positions, angles and/or have different movements. Ideally, such a method would provide a method that blends the recorded video footage into a seamless panoramic video footage (i.e., the boundaries that overlap each recorded video footage are not seen).

Furthermore, many of the video and digital video equipments have limited dynamic range when recording a video footage. In other words, many of today's video and digital video equipments have limited range when recording the contrast of scenes (i.e., range between the lightest highlight and darkest shadow in the scene). Therefore, these equipments do not record as much detail as those equipments with higher dynamic range. However, high dynamic range equipments cost substantially more than limited dynamic range equipments. Thus, there is need in the art for a practical method for increasing the dynamic range of recorded video sequences.

BRIEF SUMMARY OF THE INVENTION

Some embodiments allow a video editor to spatially and temporally align two or more video sequences into a single video sequence. As used in this application, a video sequence is a set of images (e.g., a set of video frames or fields). A video sequence can be from any media, such as broadcast media or recording media (e.g., camera, film, DVD, etc.).

Some embodiments are implemented in a video editing application that has a user selectable alignment operation, which when selected aligns two or more video sequences. In some embodiments, the alignment operation identifies a set of pixels in one image (i.e., a "first" image) of a first video sequence and another image (i.e., a "second" image) of a second video sequence. The alignment operation defines a motion function that describes the motion of the set of pixels between the first and second images. The operation then defines an objective function based on the motion function. The operation finds an optimal solution for the objective function. Based on the objective function, the operation identifies a transform, which it then applies to the first image in order to align the first image with the second image.

In some embodiments, the operation defines the motion function based on a motion model. Also, in some embodiments, the operation specifies a set of constraints and then finds an optimal solution for the objective function by optimizing the objective function based on the set of constraints. In some embodiments, the set of constraints is based on an optical flow constraint equation.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
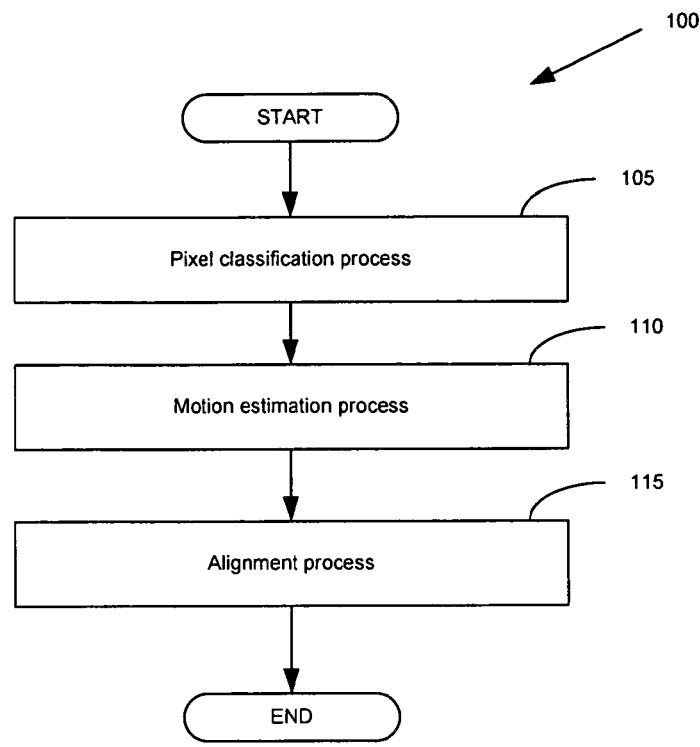
FIG. 1 illustrates a three stage process for creating a motion function to transform a frame.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Spatial and Temporal Alignment

A. Overview

Some embodiments allow a video editor to spatially and temporally align two or more video sequences into a single video sequence. As used in this application, a video sequence is a set of images (e.g., a set of video frames or fields). A video sequence can be from any media, such as broadcast media or recording media (e.g., camera, film, DVD, etc.).

Some embodiments are implemented in a video editing application that has a user selectable alignment operation, which when selected aligns two or more video sequences. In some embodiments, the alignment operation identifies a set of pixels in one image (i.e., a "first" image) of a first video sequence and another image (i.e., a "second" image) of a second video sequence. The alignment operation defines a motion function that describes the motion of the set of pixels between the first and second images. The operation then defines an objective function based on the motion function. The operation finds an optimal solution for the objective function. Based on the objective function, the operation identifies a transform, which it then applies to the first image in order to align the first image with the second image.

In some embodiments, the operation defines the motion function based on a motion model. Also, in some embodiments, the operation specifies a set of constraints and then finds an optimal solution for the objective function by optimizing the objective function based on the set of constraints. In some embodiments, the set of constraints is based on an optical flow constraint equation.

To align several images in a first video sequence with several other images in a second video sequence, some embodiments first compare at least one particular image in the first video sequence with several images in the second video sequence. Each comparison entails identifying a motion function that expresses the motion of a set of pixels between the particular image in the first video sequence and an image in the second video sequence. Some embodiments might examine different sets of pixels in the particular image when these embodiments define different motion functions between the particular image and different images in the second video sequence.

For each or some of the defined motion functions, some embodiments define an objective function, which they then optimize. Based on the optimal solution of each particular objective function, some embodiments then define a transform operation, which they apply to the particular image in order to align the particular image to an image in the second video sequence. These embodiments then select the image in the second video sequence to which they align the particular image by identifying the transform operation that resulted in the best alignment of the particular image to an image in the second video sequence. These embodiments then align the particular image in the first video sequence with the selected image in the second video sequence by applying the corresponding transform that these embodiments identified for this pair of images. To align several images in a first video sequence with several other images in a second video sequence, some embodiments compare each particular image in the first video sequence with several images in the second video sequence.

The alignment operation will now be further described by reference to FIGS. 1-10. In these figures, the alignment operation is part of a video compositing application that allows a video editor to perform the alignment operation on video frames of two or more video sequences. FIG. 1 conceptually illustrates a three-stage process 100 that some embodiments perform to align two or more video sequences.

In the first stage, the process 100 performs (at 105) a classification operation that identifies a set of pixels to track between the video sequences. In some embodiments, the process might define (at 105) different sets of pixels to track for different pairs of frames in the different video sequences. In other embodiments, the process might identify (at 105) a set of pixels in each frame of one video sequence to track in any other frame of another video sequence. In some embodiments, the classification operation identifies only sets of pixels that have a spatial frequency above a particular value (e.g., high spatial frequency values).

In the second stage, the process 100 estimates (at 110) the motion between the sets of pixels in one video sequence and the sets of pixels in at least one other video sequence. To identify the motion, the process 100, as described above, identifies the motion and objective functions and optimizes the objective functions in view of constraints.

The motion between each pair of frames is expressed in terms of a transform. In the third stage, the process 100 aligns (at 115) the video sequences by applying the identified transforms to the frames of at least one video sequence to align the video sequence with at least one other video sequence.

B. Computing an Optimal Motion Function to Transform Frame

As described above, the alignment operation uses a motion function to transform a frame in a first video sequence and aligns the transformed frame to another frame in a second video sequence. In some embodiments, computing the motion function includes three stages: (1) Pixel Classification process, (2) Correspondence process, and (3) Motion Function process.

1. Pixel Classification Process

As mentioned above, the alignment operation of some embodiments automatically selects a set of pixels to track. The pixels that are selected for tracking are pixels that might be of interest in the frames of the video sequence. Not all parts of each image contain useful and complete motion information. Thus, these embodiments select only those pixels in the image with high spatial frequency content. Pixels that have high spatial frequency content include pixels from corners or edges of objects in the image as opposed to pixels from a static monochrome, or white, background. Selecting only pixels with high spatial frequency content (i.e., useful for performing motion estimation), optimizes a pixel correspondence process that will be described next. Some embodiments can select a different set of pixels for the motion analysis of each pair of frames.

2. Correspondence Process

During the correspondence process, an estimate of a motion flow between the set of pixels for each pair frames in the video sequences is computed. The estimate of the motion flow is computed by collecting constraints about points (e.g., pixels) around each pixel in the set of pixels. The correspondence process solves a mathematical expression using the collected constraints to compute an estimate of the motion flow between each set of pixels.

To define a set of constraints, some embodiments use the classical optical flow constraint equation:

$$\text{frame}_x * u + \text{frame}_y * v + \text{frame}_t = 0 \quad \text{(equation 1)}$$

where (u,v) are unknown components of the flow, and subscripts x, y, and t indicate differentiation.

By using the optical flow constraint equation to collect constraints of neighboring points and solve the resulting over-constrained set of linear equations, some embodiments exploit the information from a small neighborhood around the examined pixel to determine pixel correspondence between frames. The set of pixels applied to the constraint equations was selected for each pixel's optimum motion estimation properties by the pixel classification process above. Thus, the selected set of optimal pixels avoids the classical ill-condition drawback that typically arises when using local motion estimation techniques. The correspondence process generates a motion flow to represent the flow field between each pair of frames in the video sequences.

3. Motion Function Process

For each pair of frames, some embodiments (1) define a motion function that expresses the motion between the frames in the video sequences, and (2) based on the motion function, define an objective function that expresses the difference between the two frames in the video sequences. For each objective function, these embodiments then try to find an optimal solution that will fit the flow-field constraints defined for that function.

In some embodiments, the motion function that expresses the motion between two frames X and Y, can be expressed as:

$$M(X) = Mo(X) * Pa \quad \text{(equation 2)}$$

Here, M(X) is the function that expresses the motion between the frames X and Y, Mo(X) is the motion model used for expressing the motion between the two frames in the video sequences, and Pa represents the set of parameters for the motion model, which, when defined, define the motion function M(X). In other words, the motion model Mo(X) is a generic model that can be used to represent a variety of motions between two frames. Equation 2 is optimized in some embodiments to identify an optimal solution that provides the values of the parameter set Pa, which, when applied to the motion model, defines the motion function M(X).

In some embodiments, the motion model Mo(X) can be represented by an m-by-n matrix, where m is the number of dimensions and n is the number of coefficients for the polynomial. One instance of the matrix Mo(x) and the vector Pa are given below:

$$Mo(X) = \begin{pmatrix} 1 & x & y & 0 & 0 & x^2 & xy & y2 & 0 & 0 & 0 \\ 0 & 0 & 0 & 1 & x & y & 0 & 0 & 0 & x^2 & xy & y2 \end{pmatrix}$$

-continued $$Pa = \begin{pmatrix} a1 \\ a2 \\ a3 \\ a4 \\ a5 \\ a6 \\ a7 \\ a8 \\ a9 \\ 10 \\ a11 \\ a12 \end{pmatrix}$$

In the example above, the motion model has two rows to indicate motion in the x-axis and motion in the y-axis.

As illustrated above, some embodiments may base the parametric motion model on a two dimensional polynomial equation represented by a two-by-twelve matrix and twelve corresponding vector coefficients. These embodiments provide the advantage of accurate motion model estimation within a reasonable computation time. The motion estimation model of other embodiments may be based on different (e.g., multi) dimensional polynomial equations. However, one of ordinary skill will recognize that polynomials having additional dimensions may require tradeoffs such as increased processing time.

Some embodiments use the motion function defined for each particular pair of frames to define an objective function for the particular pair of frames. The objective function is a sum of the difference in the location of the identified set of pixels between the two frames after one of them has been motion compensated based on the motion function. This objective function expresses an error between a motion-compensation frame (M(X)) in the pair and the other frame (Y) in the pair. By minimizing this residual-error objective function, some embodiments identify a set of parameters Pa that best expresses the motion between frames X and Y. Through the proper selection of the set of pixels that are analyzed and the reduction of the set of pixels that adversely affect the optimization of the objective function, some embodiments reduce the consideration of content motion between the pair of frames.

Equation 3 illustrates an example of the objective function R of some embodiments, which is a weighted sum of the difference between each pair of corresponding pixels ($P_{Y,i}$, $P_{X,i}$) in a pair of successive frames after one pixel ($P_{X,i}$) in the pair has been motion compensated by using its corresponding motion function.

$$R = \sum_{i=1}^{Num\_P} (C_i * E_i), \quad \text{(equation 3)}$$

where $E_i = (P_{Y,i} - (Mo(P_{X,i}) * Pa))^2$

In this equation, i is a number that identifies a particular pixel, Num_P is the number of pixels in the set of pixels being examined, and $C_i$ is a weighting factor used to value the importance of the particular pixel i in the motion analysis.

Some embodiments try to optimize the objective function of Equation (3) through two levels of iterations. In the first level of iterations, the alignment operation explores various different possible camera movements (i.e., various different sets of parameter values Pa) to try to identify a set of parameter values that minimize the objective function R, while meeting the set of defined optical flow constraints.

In the second level of iterations, the alignment operation changes one or more weighting factors $C_i$ and then repeats the first level of iterations for the new weighting factions. The second level of iterations is performed to reduce the affect of outlier pixels that improperly interfere with the optimization of the objective function R. In other words, the first level of iterations is a first optimization loop that is embedded in a second optimization loop, which is the second level of iterations.

For its second level of iterations, the alignment operation uses a weighted least squares fit approach to adjust the weighted coefficients Ci. In some embodiments, the weights of all coefficients initially have a value of one, and are re-adjusted with each iteration pursuant to the adjustments illustrated in Equation 4 below.

$$\text{if } (Ei < 1) \quad \text{(equation 4)}$$
$$Ci = \frac{(1 - Ei^2)^2}{Ei}$$
$$\text{else}$$
$$Ci = 0$$

The motion model estimation process of these embodiments accepts or rejects each pixel based on its error (i.e., its parametric motion estimation) by adjusting the error coefficient weightings over the course of several iterations. The motion estimation process ends its iterative optimization process when the desired residual error R is reached or after a predetermined number of iterations. The iterative nature of the motion model estimation process and the accurate estimation of the error coefficients ($C_i$) allow the process to accurately estimate the motion in pixels between images even in the presence of outlier points that deviate significantly in the error distribution (e.g., even in the presence of object motion in the video sequence).

Figure 2:
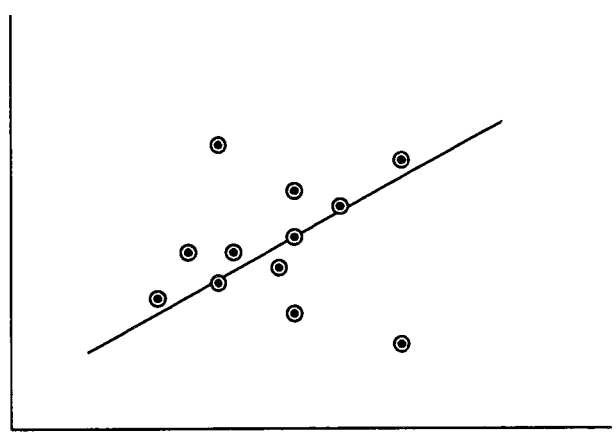
FIG. 2 illustrates an error distribution with outliers.

For instance, FIG. 2 illustrates the concept behind a weighted least square fit approach to eliminating outliers from a set of analysis point. In this distribution, the majority of the analysis pixels group approximately along the least square fit line 205, while some analysis pixels are far from this line, and these pixels are the outliers pixels (e.g., pixels associated with content motion between the two frames). FIG. 2 is only a conceptual illustration, as the least squares fit analysis is performed on more than one dimensions (e.g., on twelve dimensions associated with the twelve parameter values).

As further described below, the motion analysis of the first stage eliminates or reduces the influence of "outlier" pixels in the set of pixels that interfere with the motion analysis. Such outlier pixels have motion that if accounted for in the analysis would interfere with the motion analysis. In other words, the motion of these outlier pixels differs significantly from the motion of the other pixels in the selected pixel set. This differing motion might be due to the fact that the outlier pixels are part of objects that are moving in the scene(s) capture by the video sequence (i.e., of objects that have a desired movement in the sequence and that are not due to undesired camera movement). Outlier pixels might also be due to illumination changes. Previous video editing tools in the art assumed fixed lighting conditions. However, new cameras have automatic exposure and other features that affect the parameter values, such as illumination or lighting.

Thus, the first stage of some embodiments for motion estimation is robust, meaning that these embodiments distinguish between moving objects and illumination changes in the video sequence. Also, some embodiments allow the user to specify mask regions in order to exclude certain image areas from the transformation.

II. Alignment of Multiple Video Sequences

Figure 3:
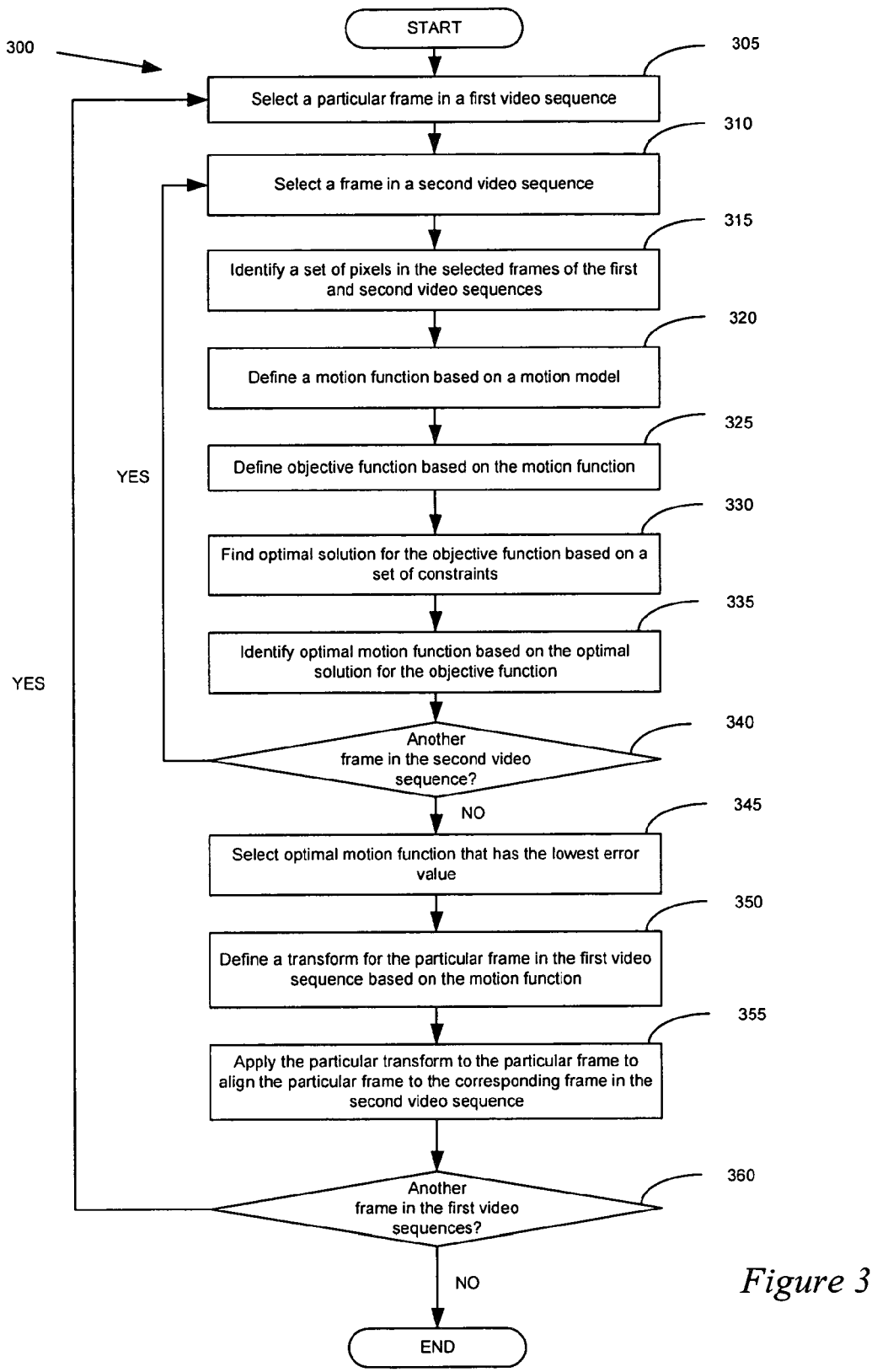
FIG. 3 illustrates a method for aligning frames in video sequences.

FIG. 3 illustrates a method 300 that some embodiments perform to spatially and temporally align two video sequences into a single video sequence. In some embodiments, the method 300 is used to combine two video sequences to produce a panoramic video sequence (i.e., wide angle video sequence).

As shown in this figure, the method 300 selects (at 305) a particular frame in the first video sequence. The method 300 selects (at 310) a frame in the second video sequence. The method 300 identifies (at 315) a set of pixels in the selected frames of the first and second video frames. Specifically, the method 300 identifies (at 315) a set of pixels in the frame in the second video sequence that best matches a set of pixels in the particular frame in the first video sequence. In some embodiments, the method 300 identifies (at 315) a set of pixels in the selected frames that has a spatial frequency content above a particular value (e.g., high spatial frequency content value).

The method 300 defines (at 320) a motion function based a motion model. To find an optimal motion function, the method 300 defines (at 325) an objective function based on the motion function. In some embodiments, the objective function is a weighted sum of the difference between each pair of corresponding pixels in a pair of frames after one pixel in the pair has been compensated by using its corresponding motion function (e.g., equation 2). Next, the method 300 finds (at 330) an optimal solution for the objective function on a set of constraints. In some embodiments, the optimal solution for the objective function is found by optimizing the objective function through several levels of iterations, such as the one described in Section. I.B.3. Once the optimal solution is found (at 330), the method 300 identifies (at 335) an optimal motion function between the particular pair of frames based on the optimal solution for the objective function.

Next, the method 300 determines (at 340) whether there is another frame in the second video sequence. If so, the method 300 proceeds to select (at 310) another frame in the second video sequence. In some embodiments, the steps 310-335 are iteratively performed until all the frames in the second video sequence have been selected. Therefore, the method 300 iteratively identifies a particular optimal motion function for each particular pair of frames in the video sequences.

If the method 300 determines (at 340) there is no other frame in the second video sequence, for the particular frame in the first video sequence, the method 300 selects (at 345) an optimal motion function that has the lowest objective function value from the set of identified motion function. In other words, the method 300 selects (at 345) the motion function that produces the lowest error between each pair of corresponding pixels in the frames of the first and second video sequences.

The method 300 defines (at 350) a transform based on the selected motion function for the particular frame in the first video sequence. Next, the method 300 applies (at 355) the defined transform to the particular frame in the first video sequence to align the particular frame to a corresponding frame in the second video sequence. The corresponding frame in the second video sequence is based on the pair of frames that defined the selected (at 345) motion function. For example, if the selected motion function was computed from the second frame in the first video sequence and the fifth frame in the second video sequence, then the transformed second frame in the first video sequence would be aligned to the fifth frame in the second video sequence.

After aligning the pair of frames (by applying the transform), the method 300 determines (at 360) whether there is another frame in the first video sequence. If so, the method 300 proceeds to 305 to select another frame in the first video sequence. If not, the method 300 ends. In some embodiments, several iterations of the above method 300 are performed until all the frames in the first and second video sequences are selected.

In some embodiments, some or all of the steps of selecting an optimal motion function, defining a transform, and applying the transform to align the frames are performed after the motion functions have been computed for all possible pairs of frames in the first and second video sequences. In other words, some or all the steps at 345, 350 and/or 355 are performed after determining (at 360) there are no other frames in the first video sequence. In such instances, a list of possible pairs of frames is generated, along with its corresponding motion function and objective function value. From this list, the method 300 (1) selects a corresponding motion function for each frame in the first video sequence based on the objective function value, (2) defines a transform for each frame in the first video sequence based on the corresponding motion function, and (3) applies the transform to the particular frame to align the particular frame to its corresponding frame in the second video sequence.

In some embodiments a particular transform is defined for each pair of corresponding frames, while other embodiments define one universal transform for all pairs of associated frames. Moreover, some embodiments compute motion functions for several pairs of frames between the first and second video sequences to determine which particular pair of frames should be the first pair of frames. Some embodiments then sequentially associate subsequent frames in the first and second sequences based on the determined first pair of frames. Thus for example, if the fourth frame of the first video sequence is associated to the ninth frame of the second video sequence, the fifth frame of the first video sequence is associated to the tenth frame of the second video sequence, and so on and so forth. In such instances, a particular transform is used for each pair of frames, where the transform is based on the motion function for that particular pair of frames. In some instances, one universal transform may be used for all pairs of frames, where the universal transform is based on the motion function of the first pair of frames.

Figure 4:
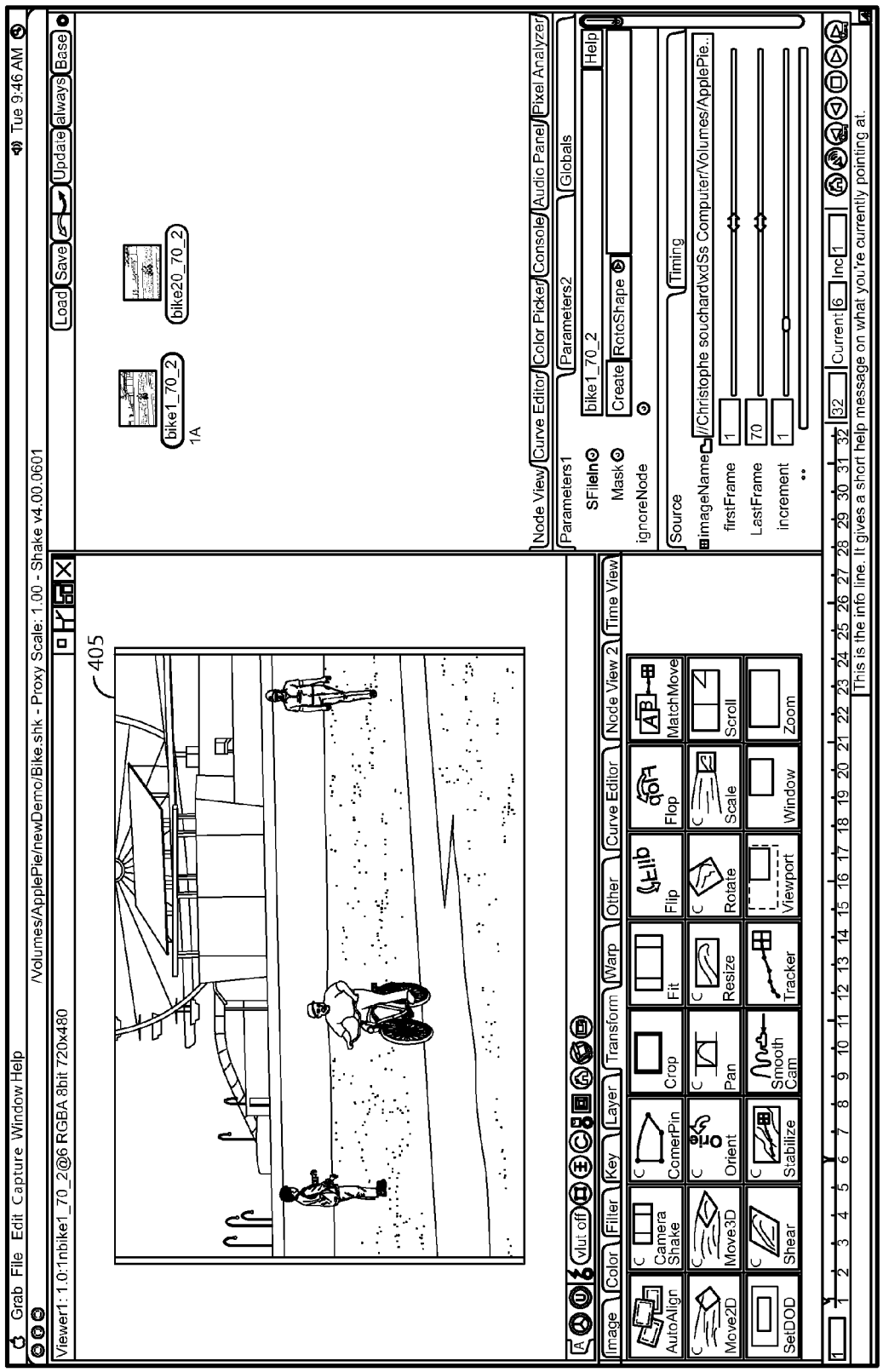
FIG. 4 illustrates a frame in a first video sequence.
Figure 5:
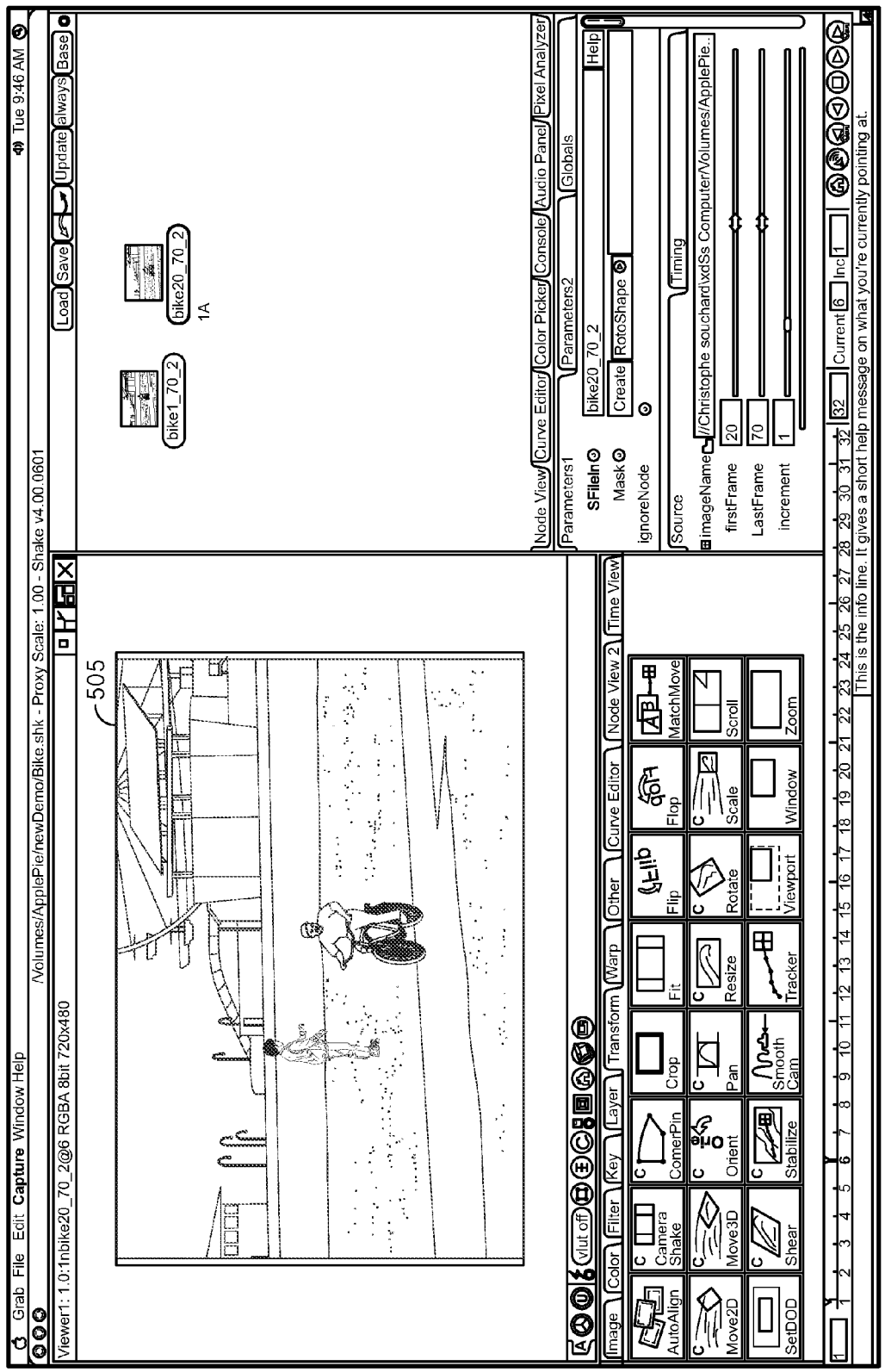
FIG. 5 illustrates a frame in a second video sequence.

Having described a method for spatially and temporally aligning video sequences, an implementation of the method in a video editing application will now be described. FIGS. 4-10 illustrates a graphical user interface of a video editing application that can perform the method 300. FIG. 4 illustrates a first frame 405 in a first video sequence. FIG. 5 illustrates a first frame 505 in a second video sequence. The frames 405 and 505 show a similar scene, except that some of the objects (e.g., person, background) in the frames are not in the same position.

Figure 6:
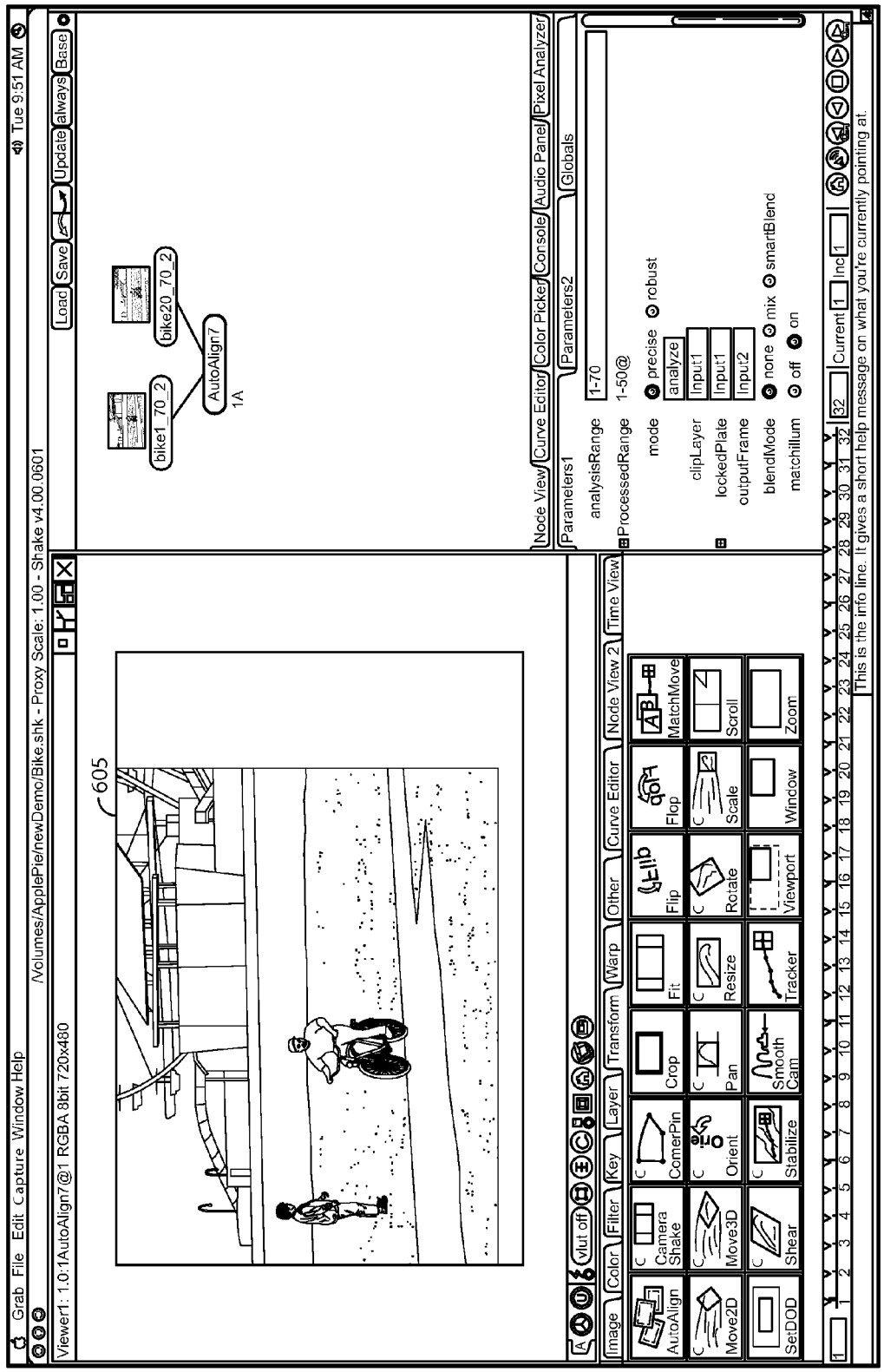
FIG. 6 illustrates a frame in the second video sequence that is matched to a first frame in the first video sequence.
Figure 7:
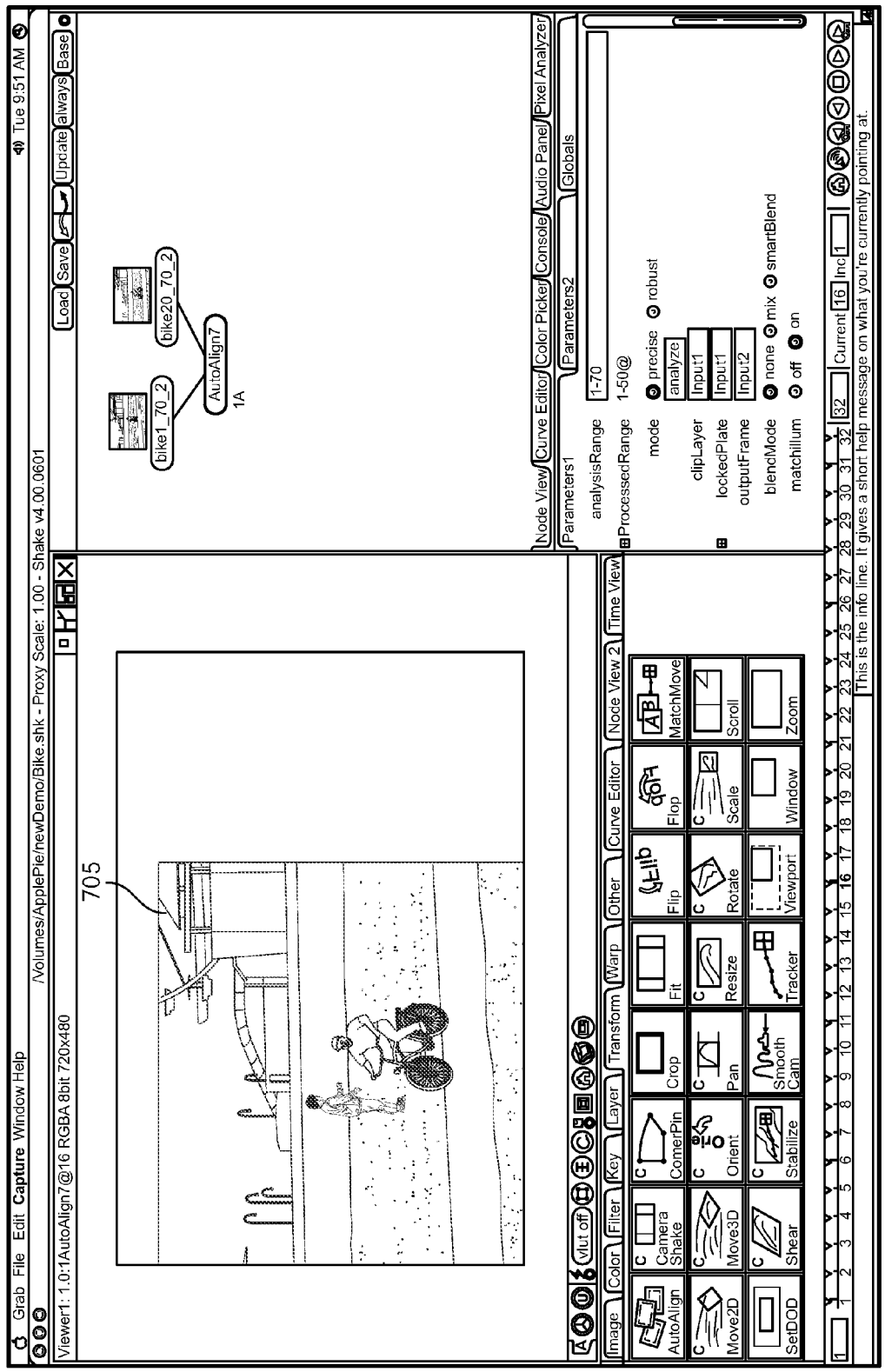
FIG. 7 illustrates a frame in the second video sequence that is matched to a second frame in the first video sequence.
Figure 8:
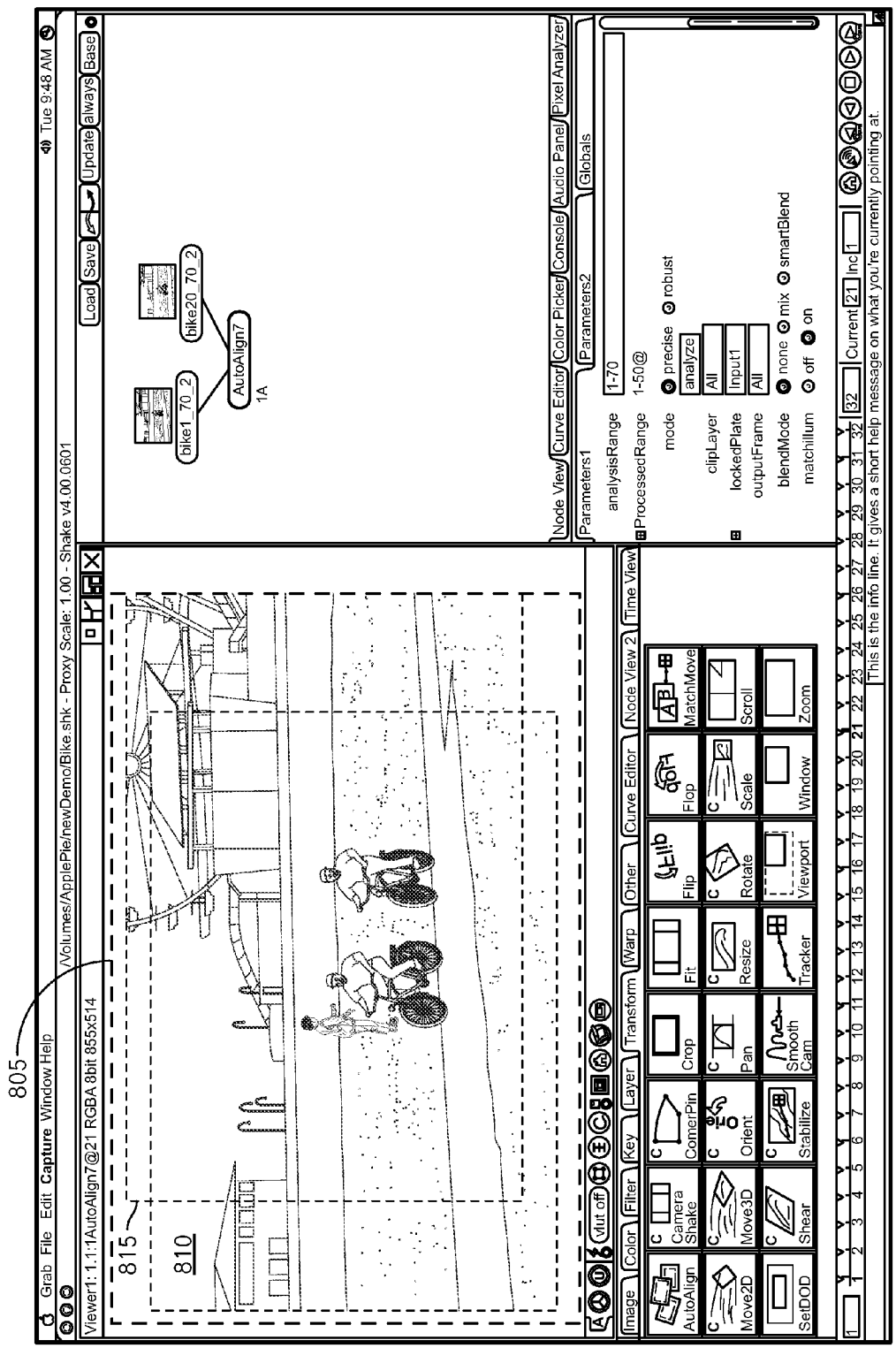
FIG. 8 illustrates a frame produced from two aligned frames from different video sequences.
Figure 9:
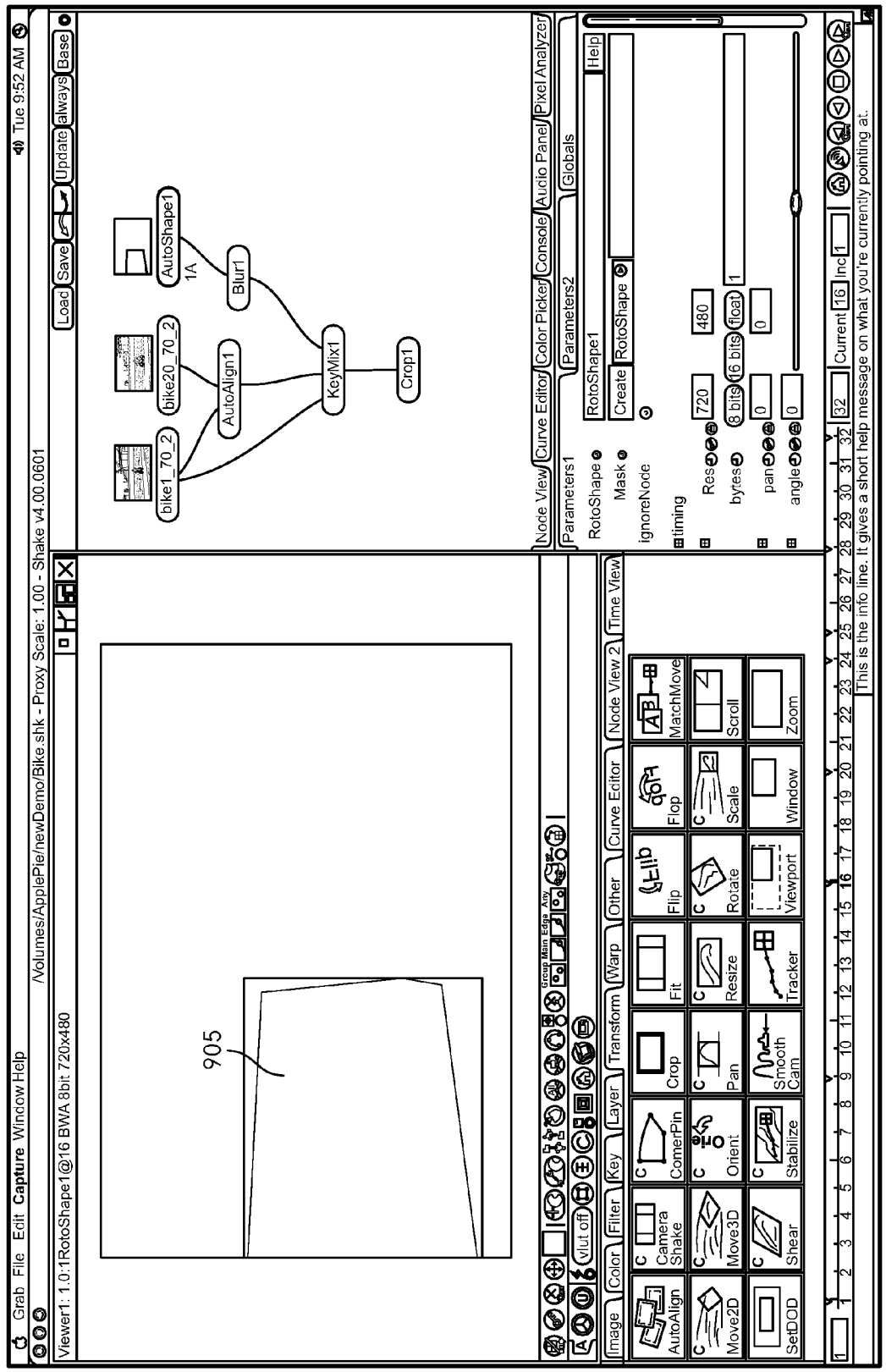
FIG. 9 illustrates a mask region used to exclude certain pixels of the aligned frame.

FIG. 6 illustrates a frame 605 in the second video sequences that best matches the first frame 405 of the video sequence. In some embodiments, this particular frame 605 from a set of frames in the second video sequences best matches the first frame 405 because the particular frame 605 has the lowest objective function value. FIG. 7 illustrates another frame 705 from the set of frames in the second video sequence that best matches a second frame in the first video sequence. FIG. 8 illustrates a frame 805 based on frames 810 and 815 in the first and second video sequences. As shown in this figure, the frame 810 from the first video sequence is aligned to the frame 815 from the second video sequence to produce a composited frame 805.

Figure 10:
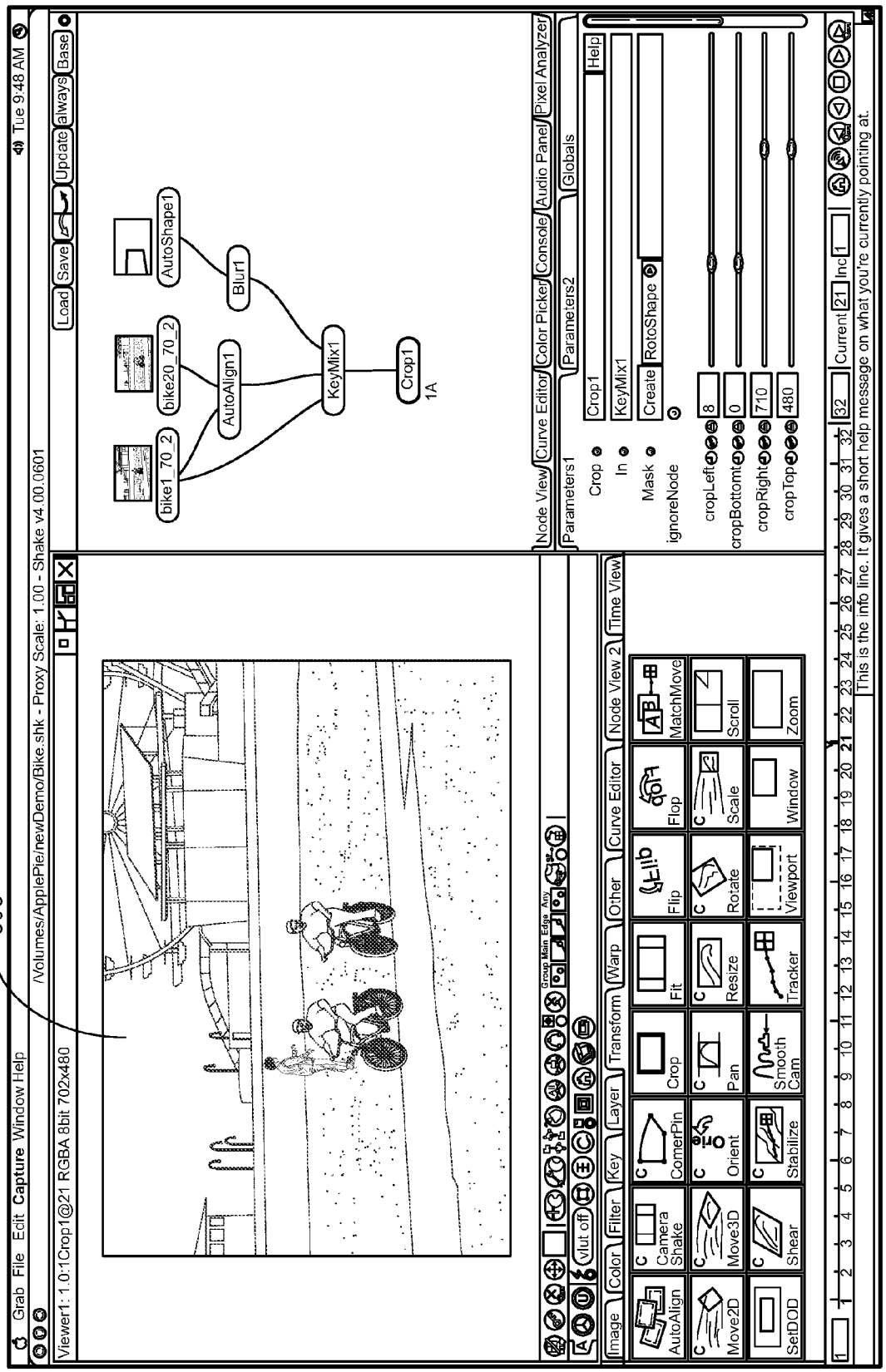
FIG. 10 illustrates a frame produced from a mask region and two aligned frames from different video sequences.

As shown in FIG. 8, the composited frame 805 has an uneven boundary. The uneven boundary occurs because the frames do not completely overlap each other. Some embodiments specify a mask region to remove the uneven boundary, such as the mask region 905 shown in FIG. 9. In some embodiments, the mask regions exclude certain frame areas from the motion function transformation. Thus, certain pixels in the frames are not transformed. FIG. 10 illustrates the composited frame 805 after the mask region 905 is specified.

The above alignment operation describes spatially and temporally aligning two video sequences. However, the alignment operation can also be used to align more than two video sequences. Furthermore, the above alignment operation can be used to align images that are not part of a video sequence.

III. Alignment of Images to Produce a Panoramic Image

Figure 11:
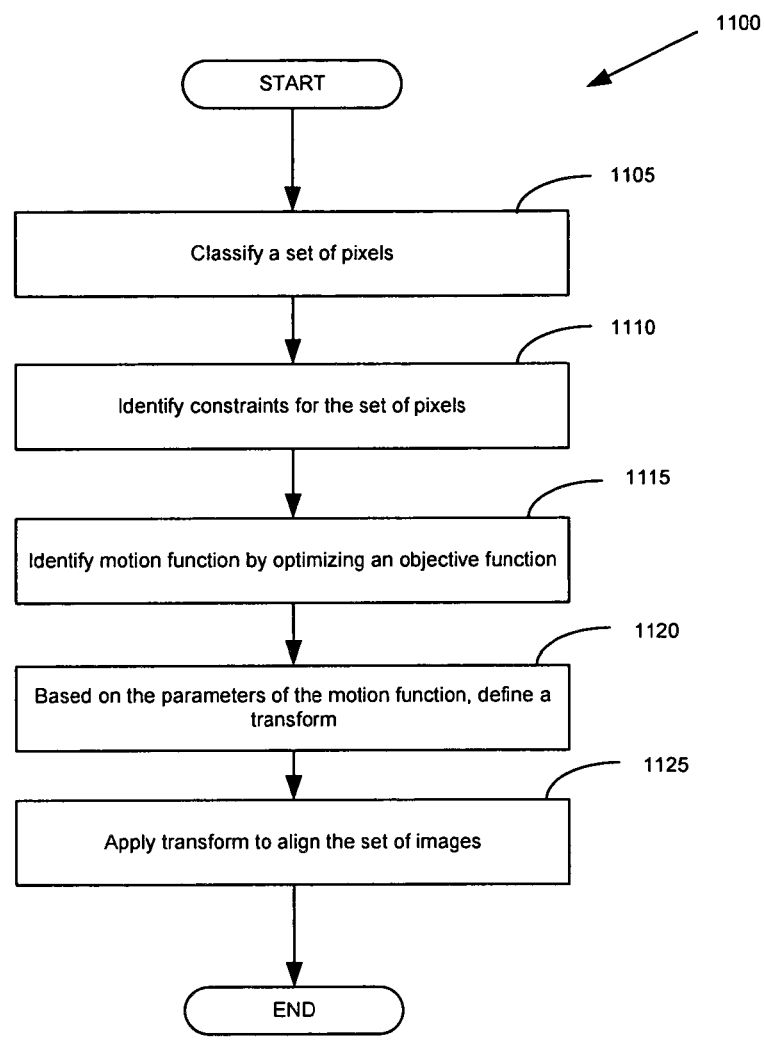
FIG. 11 illustrates a method for aligning two or more images to produce a panoramic image.

FIG. 11 illustrates a method 1100 for aligning several images to produce a panoramic image (i.e., wide angle image). Specifically, the method 1100 will be described by reference to FIGS. 12 to 19, which illustrate a graphical interface of a video application editor that can perform the method 1100 for producing a panoramic image from three different images.

As shown in FIG. 11, the method 1100 classifies (at 1105) a set of pixels in a first image. As mentioned above, during this pixel classification process (at 1105), the method 1100 selects a set of pixels in each image of the set of images for tracking. In some embodiments, the identified set of pixels only includes pixels with high spatial values.

After the pixel classification process is performed (at 1105), the method 1100 identifies (at 1110) constraints for the identified set of pixels. In some embodiments, the constraints are identified by using a classical optical flow constraints equation.

Next, the method 1100 identifies (at 1115) a motion function for each pair of images in the set of images by optimizing an objective function for each pair of images. Each motion function is based on a motion model, such as one described in Section I.B.3. The motion function for a particular pair of images expresses a motion difference between the particular pair of images. Thus, when the set of images includes three images 1205-1215, some embodiments identify a motion function for the set of pixels in the first and second images 1205 and 1210, the first and third images 1205 and 1215, and the second and third images 1210 and 1215.

To identify the motion function for a particular pair of images, the method 1100 optimizes (at 1115) an objective function based on the set of constraints that was previously identified (at 1110). In some embodiments, identifying the motion function includes identifying the parameters of the motion function.

Next, the method 1100 defines (at 1120) a transform for a particular image based on the parameters of the motion functions that were identified (at 1115) for a particular pair of images that includes the particular image. During some embodiments, the method 1100 (at 1115) first determines which image from the set of images is the locked image. In some embodiments, the locked image is the reference image that other images will be aligned to during the alignment process, which will be described next. Once the locked image is determined, the method 1100 defines a transform for each particular image in the set of images based on the identified motion function corresponding to the particular image and the locked image.

After the transform has been defined (at 1120), the method 1100 applies (at 1125) the defined transform to align a particular image to another image and ends. In some embodiments, the method 1100 applies (at 1125) a particular transform to each particular image to align each particular image to the locked image.

Figure 12:
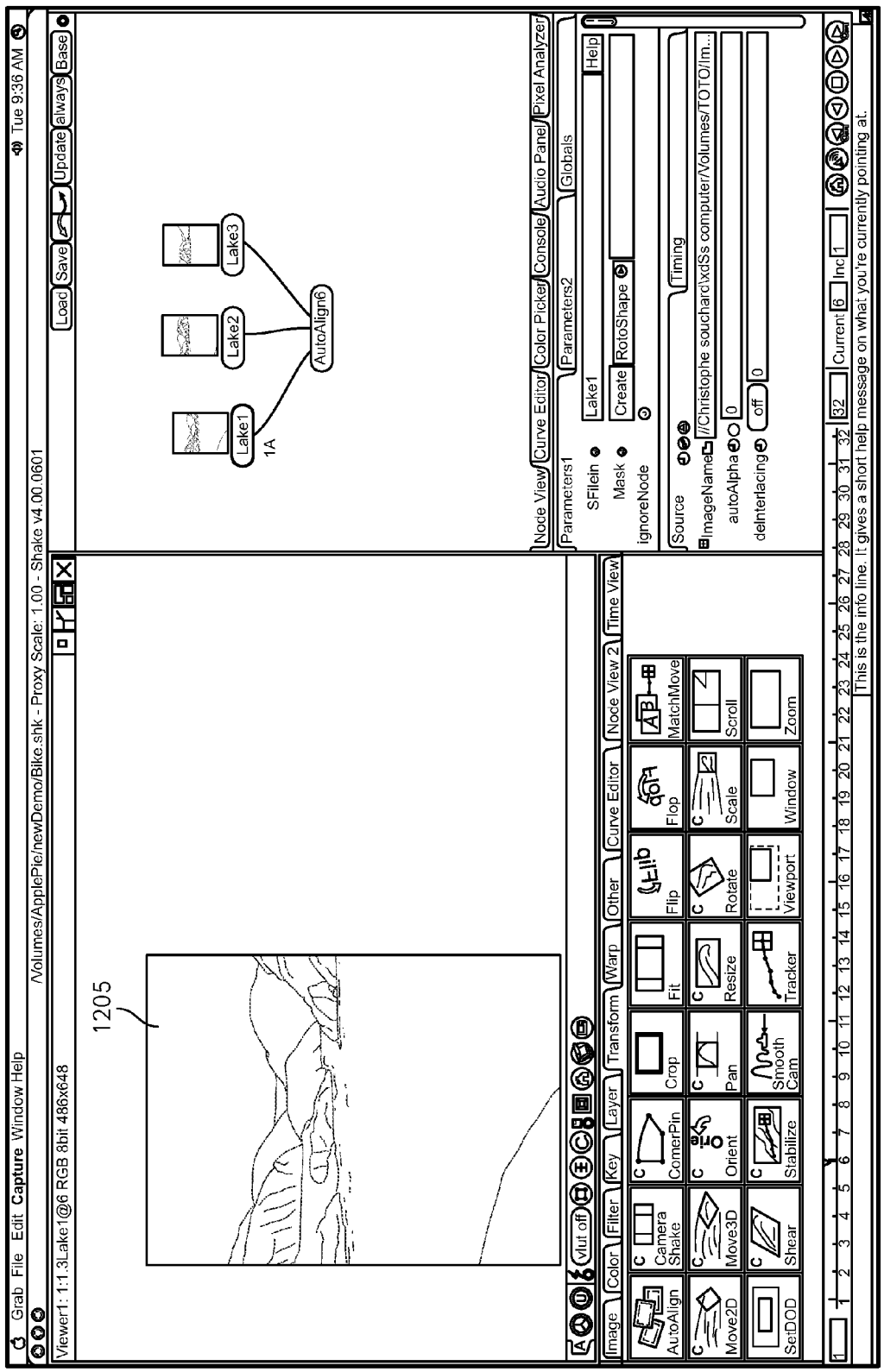
FIG. 12 illustrates a first image in a graphical user of a video editing application.
Figure 13:
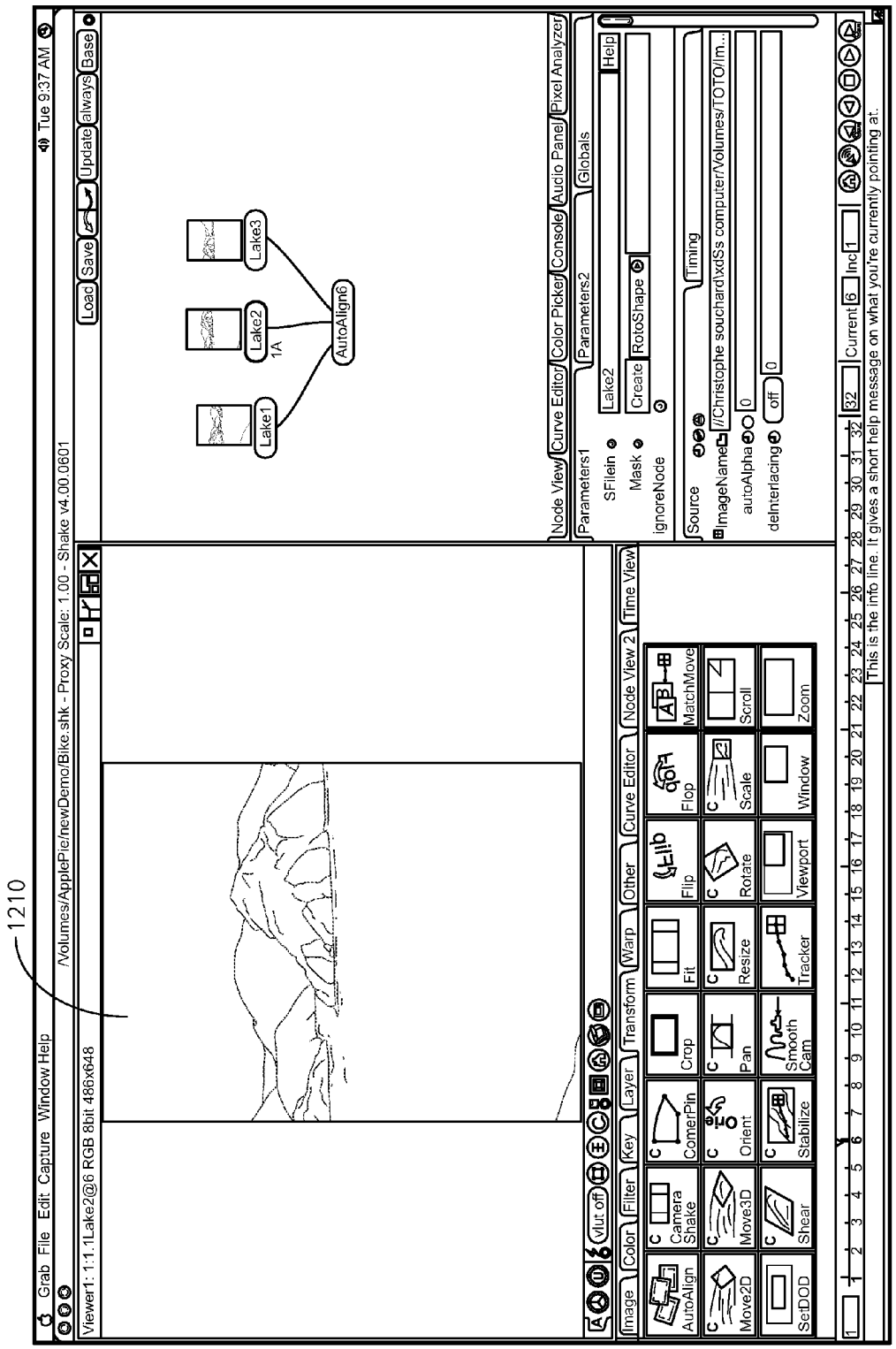
FIG. 13 illustrates a second image in the graphical user of the video editing application.
Figure 14:
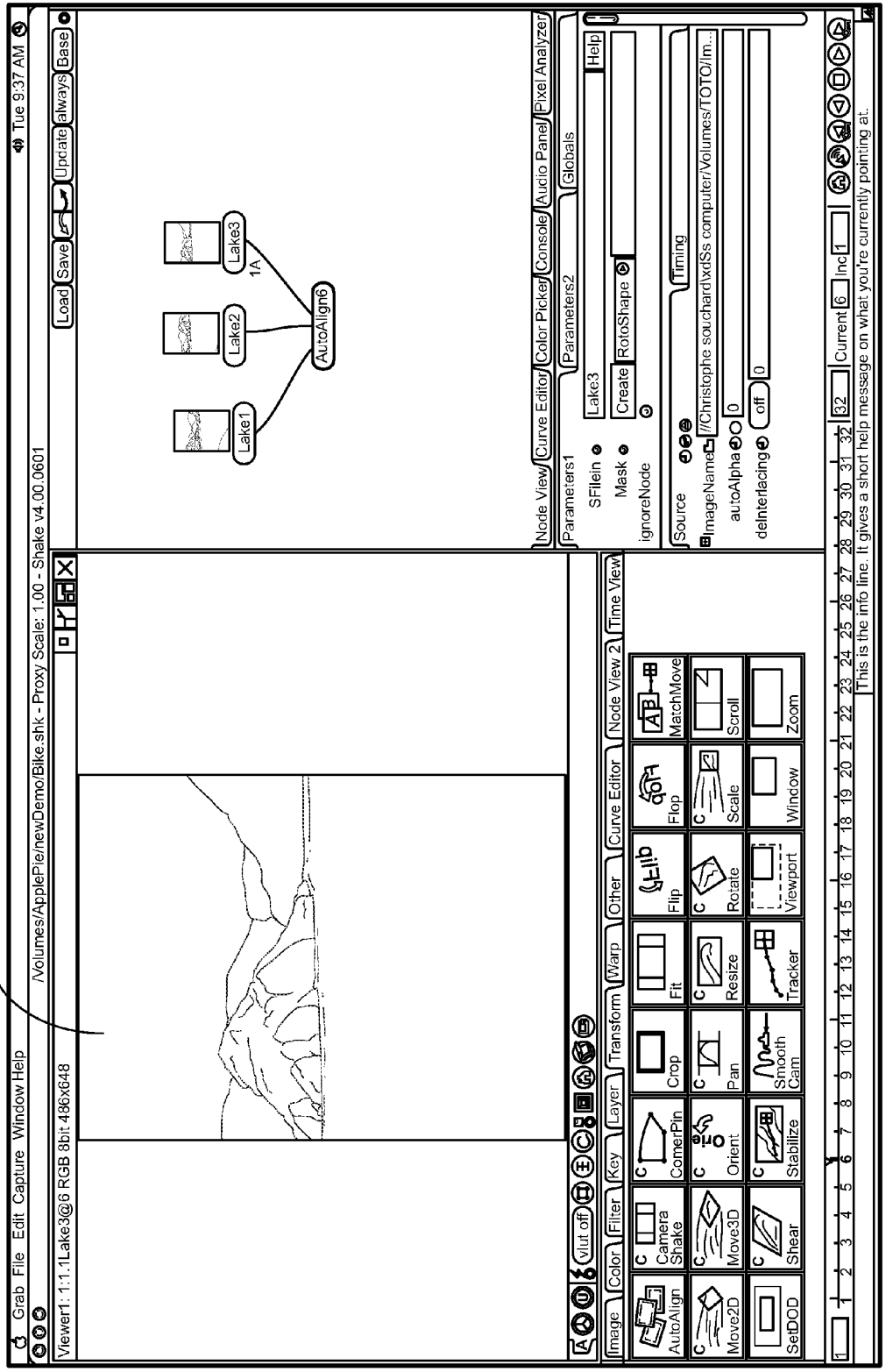
FIG. 14 illustrates a third image in the graphical user of the video editing application.
Figure 15:
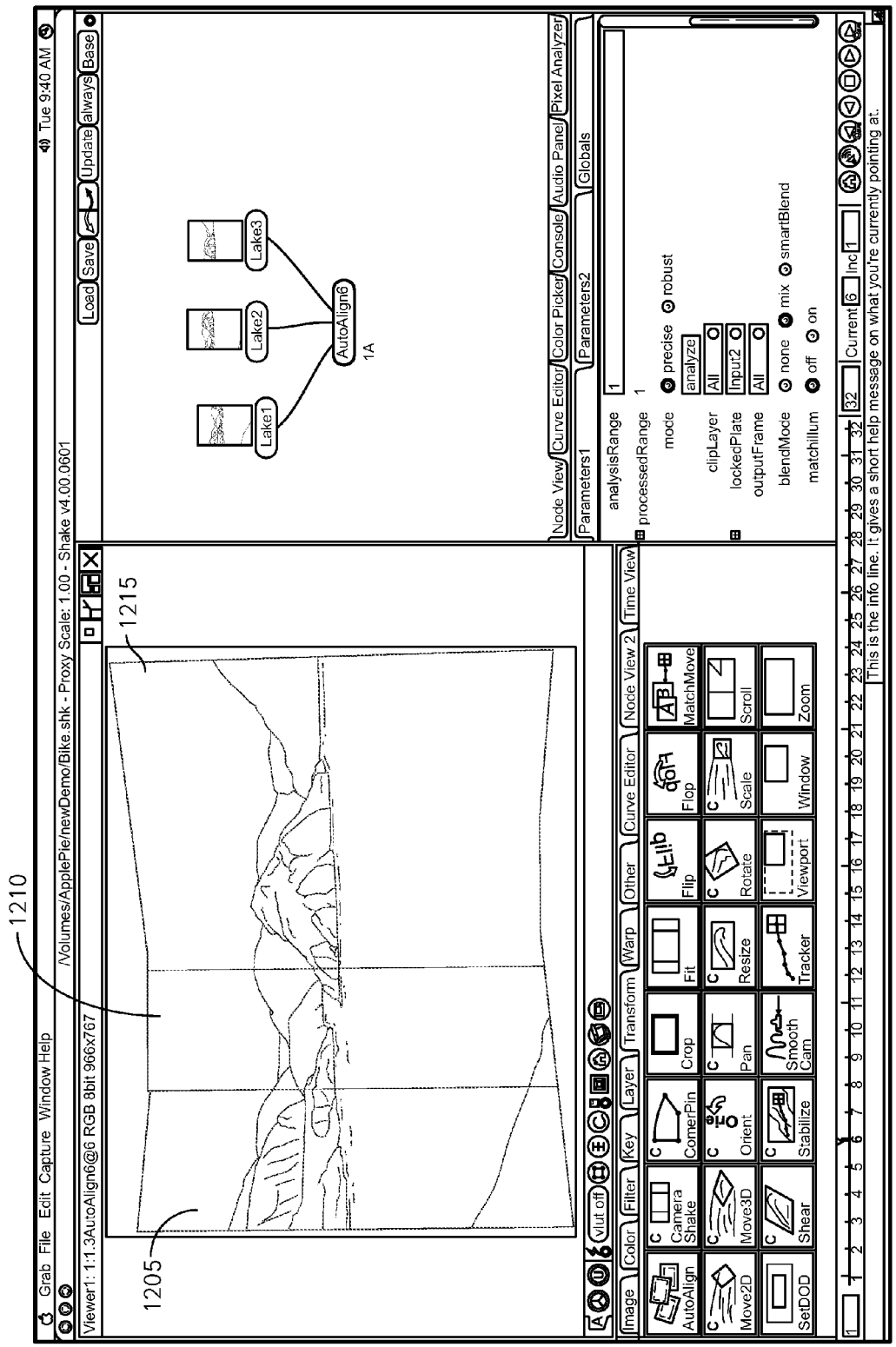
FIG. 15 illustrates a panoramic image based on the images of FIGS. 12-14.

FIG. 15 illustrates a panoramic image that was produced based on the three images of FIGS. 12-14. As shown in this figure, the second image 1210 is the locked image. As such, the first image 1205 and the third image 1215 are defined transforms based on their respective motion function with the second image 1210. The defined transforms are then applied on their respective images 1205 and 125 to align the first and third images 1205 and 1215 with the second image 1210. As further shown in this figure, the boundary lines where the first, second and third images meet are shown.

Figure 16:
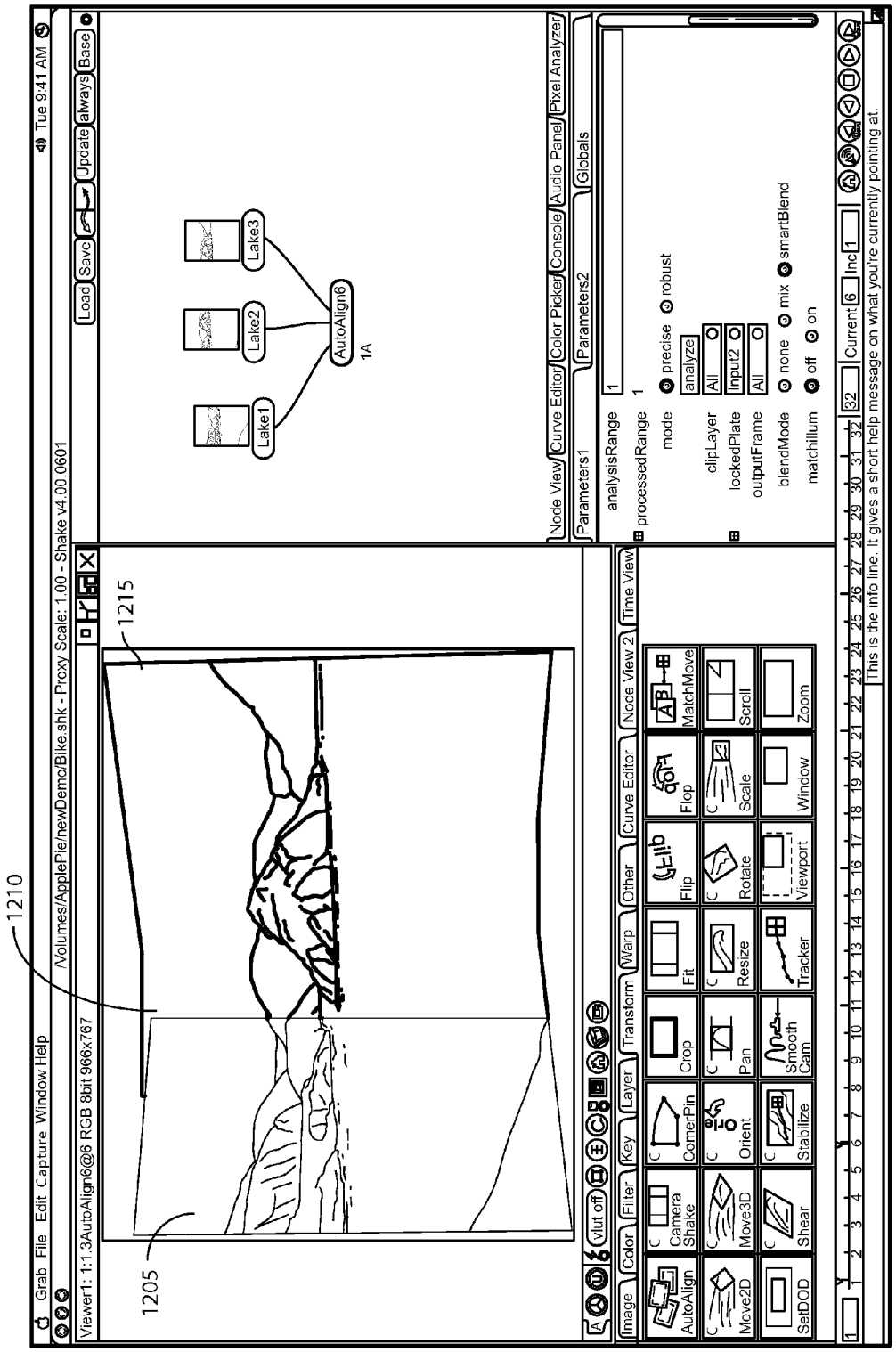
FIG. 16 illustrates a panoramic image based on the images of FIGS. 12-14, where the boundary lines between the images are removed.

FIG. 16 illustrates the same panoramic image as in FIG. 15, except that the boundary lines in the panoramic image has been removed through the use of a blend operation. In some embodiments, the blend operation is an operation that determines regions in the panoramic image that contain overlapping images. Some embodiments blend these overlapping regions by taking a weighted value of the pixels relative to each pixel's distance from the boundary lines. Some embodiments use the following equation to take the weighted value of the pixels:

$$P = \frac{(D_1 * P_1 + D_2 * P_2)}{(D_1 + D_2)}, \quad \text{(equation 5)}$$

Figure 20:
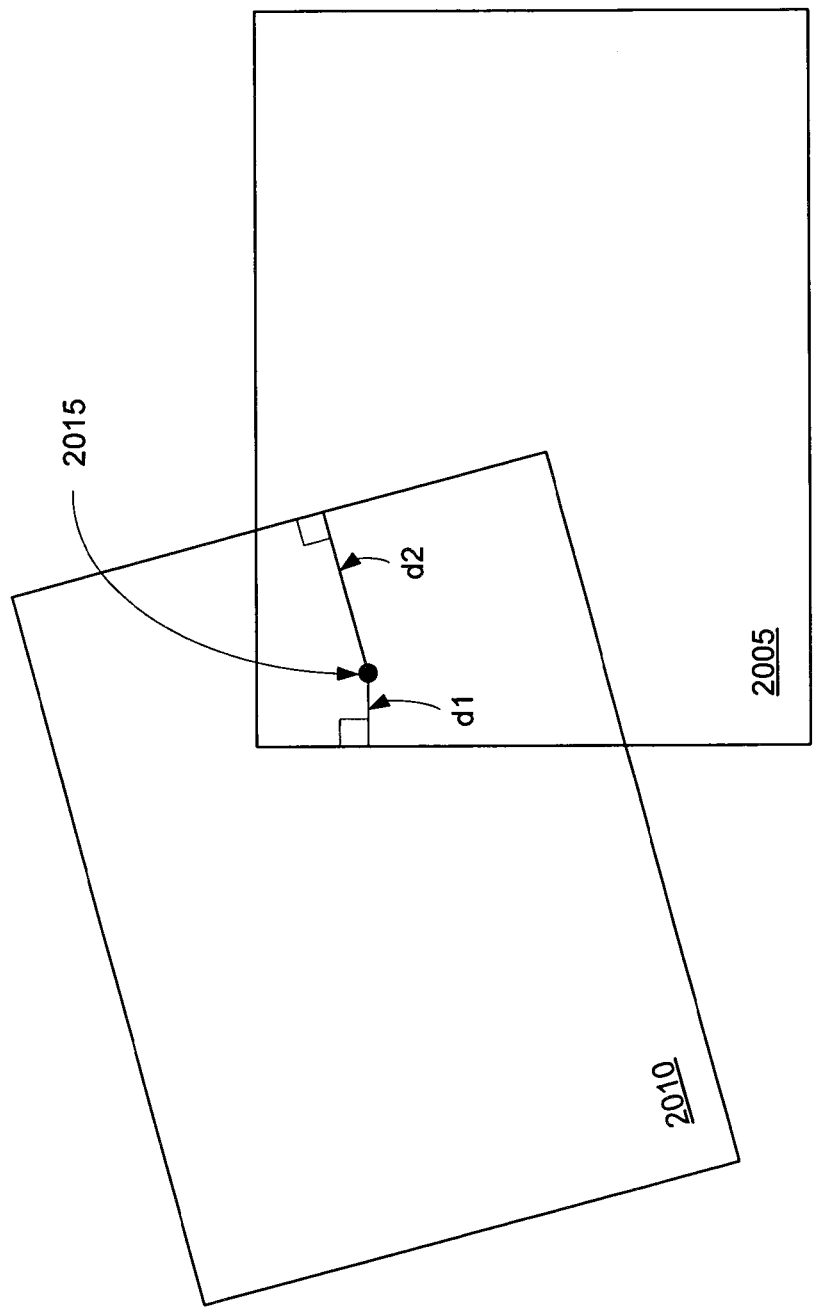
FIG. 20 illustrates an example of distances used to compute the weighted value of the pixels.

In this equation, $P_1$ and $P_2$ are the pixel values at a particular location in the first and second images, $D_1$ and $D_2$ are each pixel's respective distances from the boundary lines. FIG. 20 illustrates an example of distances used to compute the weighted value of the pixels. As shown in this figure, the first and second pixels of frames 2005 and 2210 are both located at location 2015. The first distance d1 is measured from the location 2015 to the left boundary of the first frame 2005. The second distance d2 is measured from the location 2015 to the right boundary of the second frame 2010. However, different embodiments may use different distances. For instance, some embodiments may use the distance to the upper or lower boundaries of the frames or combinations of distances to the upper, lower, left, and/or right boundaries.

Figure 17:
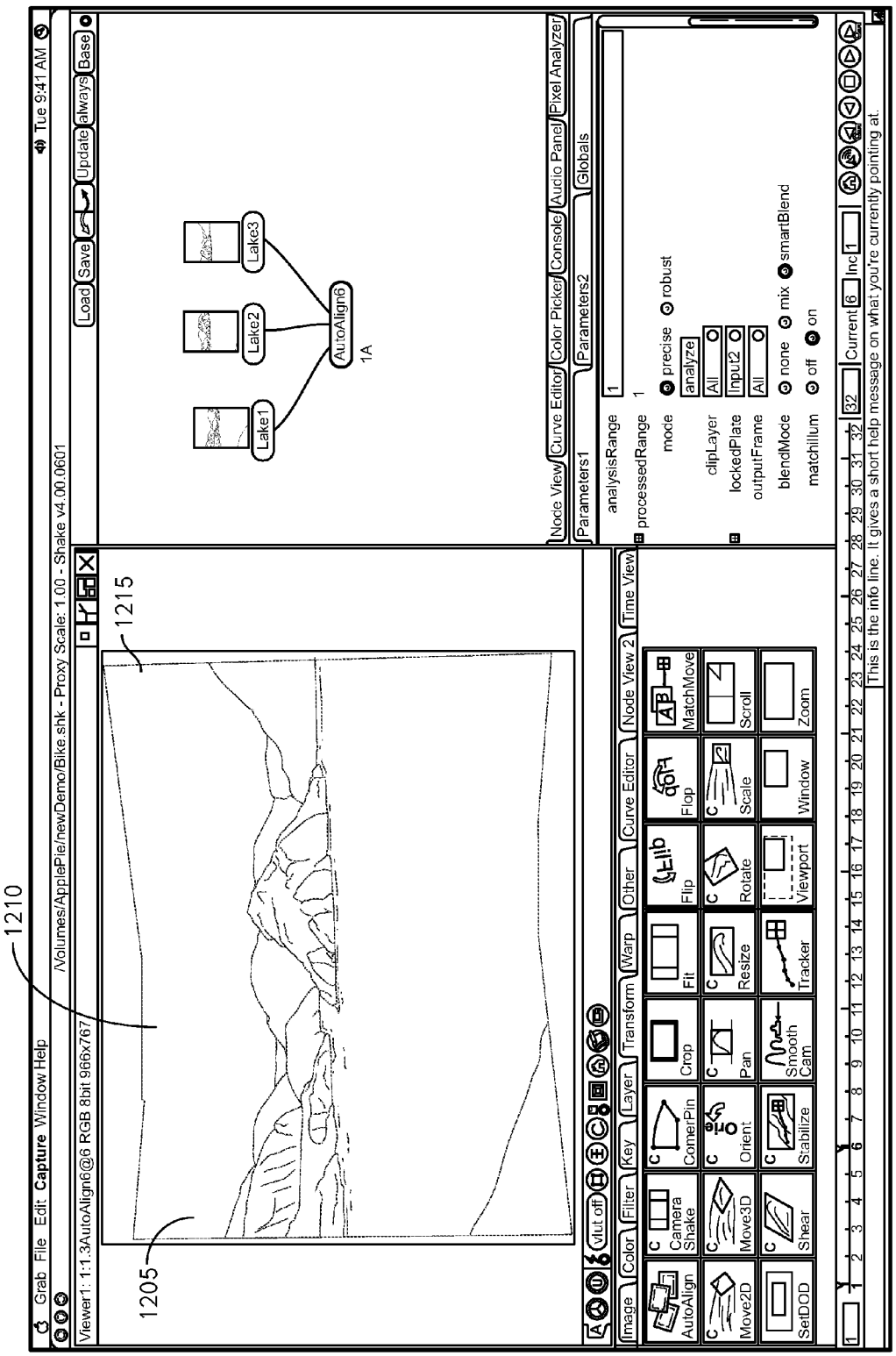
FIG. 17 illustrates a panoramic image based on the images of FIGS. 12-14, where the boundary lines between the images are removed and the illumination of the images is matched.

Some embodiments also perform an illumination matching operation on the panoramic image in lieu of, conjunction or addition to blending images to remove boundary lines in a panoramic image, thus creating a seamless panoramic image. FIG. 17 illustrates a panoramic image after blending and illumination matching operations have been performed. As shown in this figure, the boundary lines have been removed, and the illumination of the pixels around the overlapping regions have been matched.

Figure 18:
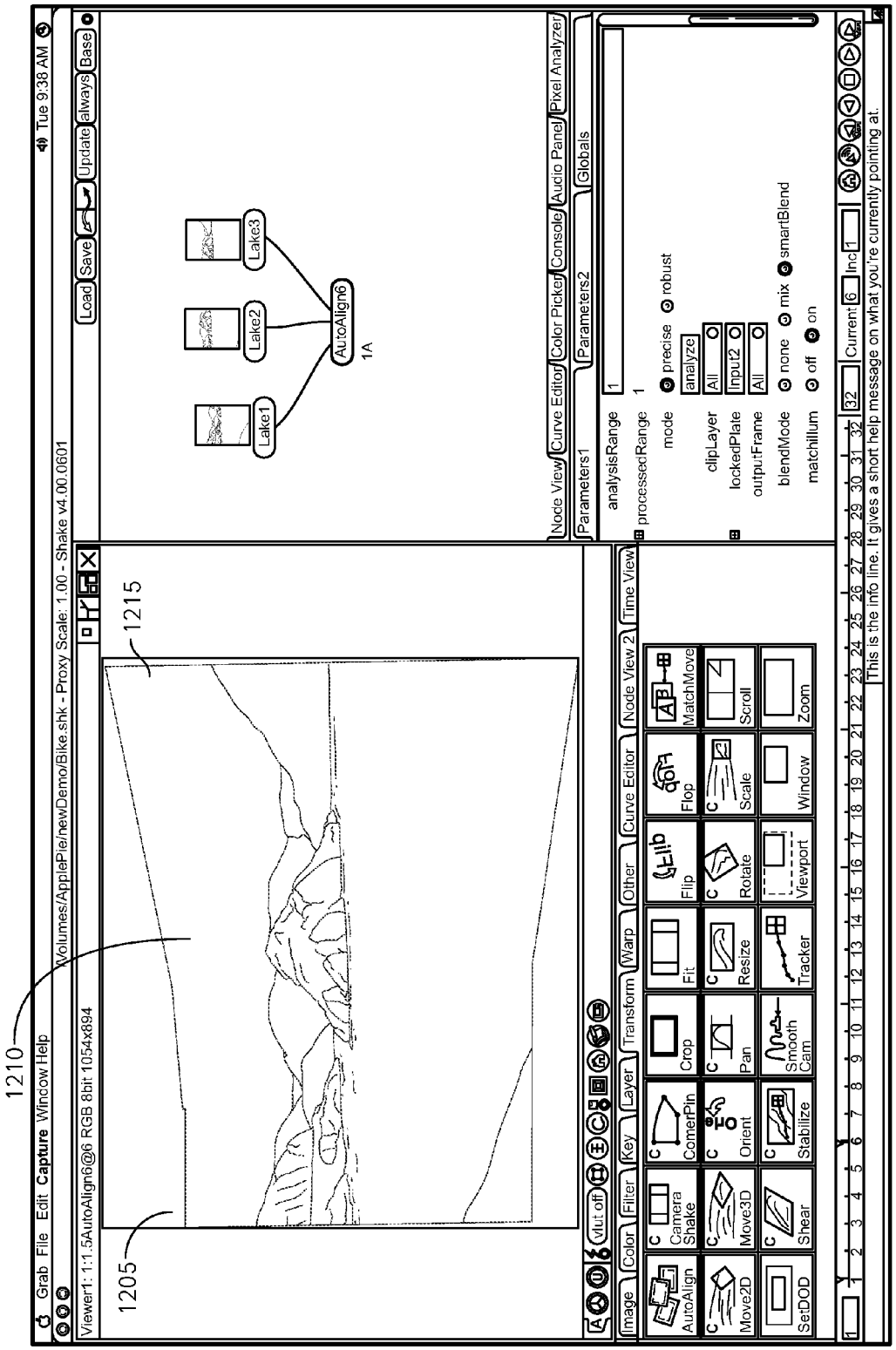
FIG. 18 illustrates a panoramic image based on the images of FIGS. 12-14, where the boundary lines between the images are removed and the images are locked to a first image.
Figure 19:
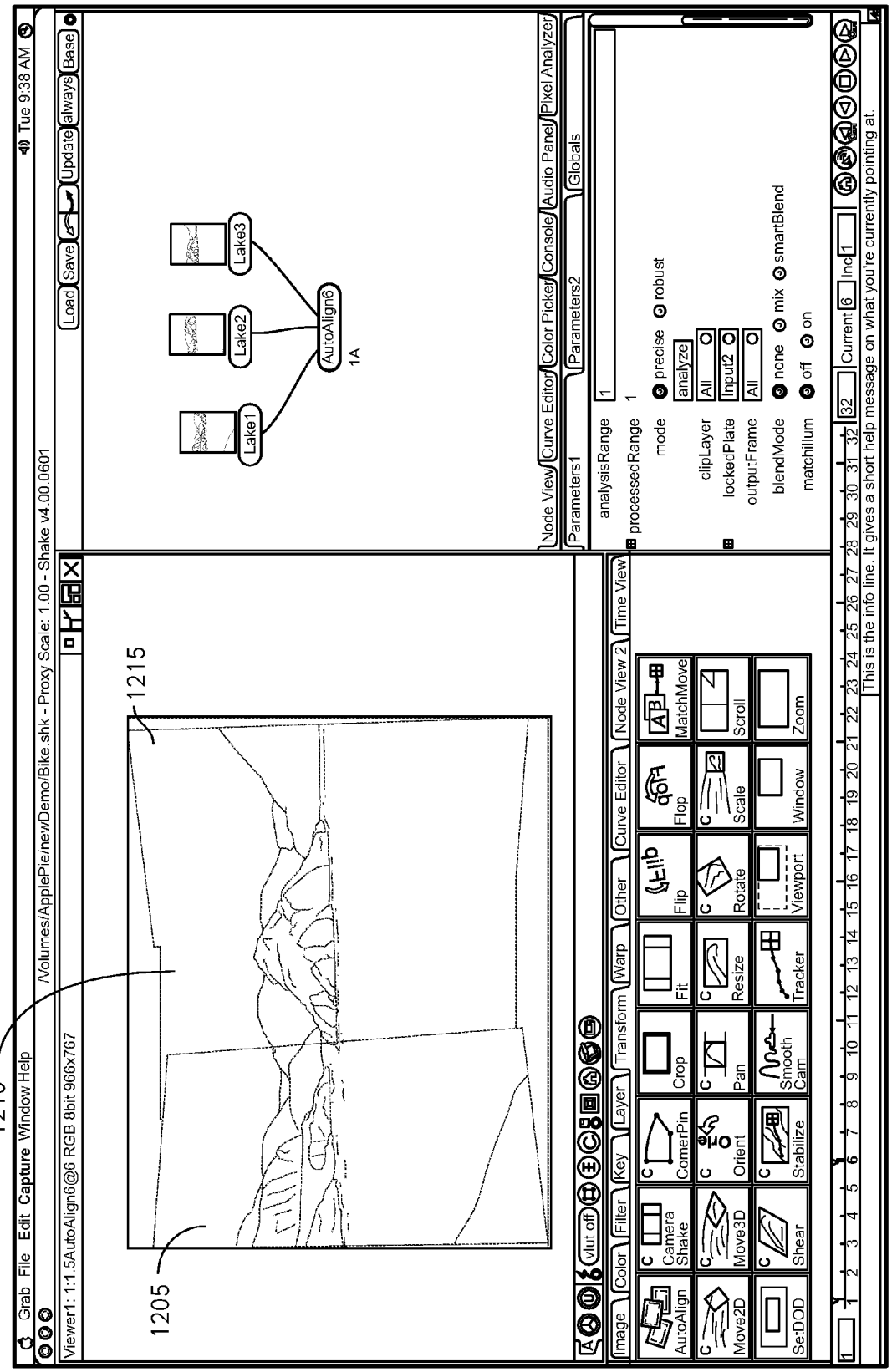
FIG. 19 illustrates a panoramic image based on the images of FIGS. 12-14, where the images are locked to a second image.

As mentioned above, some embodiments align a set of images to a locked image. The locked image can be any image in a set of images. FIG. 18 illustrates a panoramic image where the first image 1205 is locked, and the second and third images 1210-1215 are transformed and aligned to the first locked image 1205. FIG. 19 illustrates a panoramic image where the second image 1210 is locked, and the first and third images 1205 and 1215 are transformed and aligned to the second locked image 1210.

While the method of aligning a set of images to produce a panoramic image has been described with reference to numerous steps that are performed in a particular order, one of ordinary skill in the art will recognize that some of the above mentioned steps can be performed in a different order. For example, in some embodiments, the method 1100 determines which image in the set of images is the locked image before identifying (at 1110) a motion function for each pair of images. In such instances, the method only identifies a motion function for each pair of images that includes the locked image, and not all pairs of images in the set of images.

IV. High Dynamic Range Images

In addition to producing panoramic images from a set of images, some embodiments provide a method for producing high dynamic range images. A dynamic range is the range between the lightest highlight and darkest shadow in the image. In some embodiments, a dynamic range of an image is the contrast between the lightest and darkest region in the image. In some embodiments, a dynamic range is the range of luminance of an image.

Figure 21:
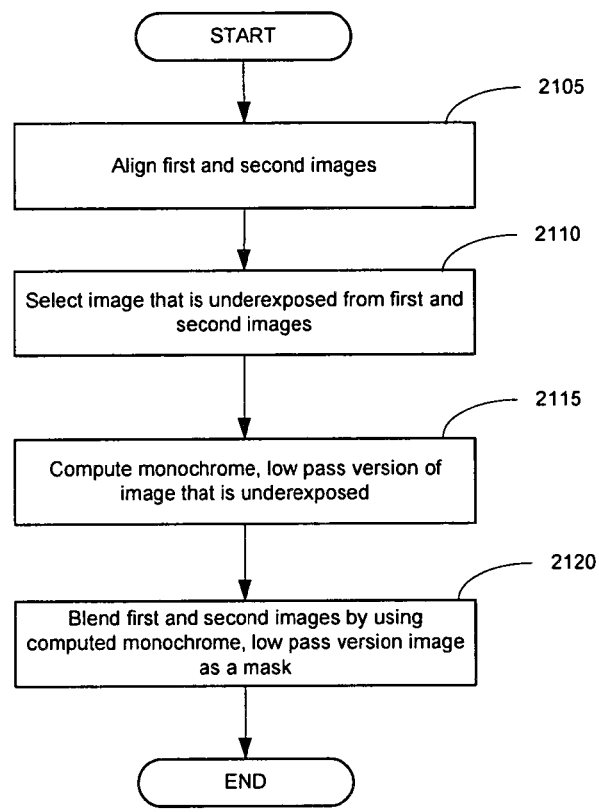
FIG. 21 illustrates a method for producing a high dynamic range image from a set of images.

FIG. 21 illustrates a method 2100 for producing such a high dynamic range image. The method 2100 will be described in reference to FIGS. 22-24, which illustrates the graphical user interface of a video editing application that is capable of producing high dynamic range images.

As shown in FIG. 21, the method 2100 aligns (at 2105) first and second images. In some embodiments, the method 2100 aligns (at 2105) the first and second images by transforming one of the images by applying a motion function, such as the one described above.

Figure 22:
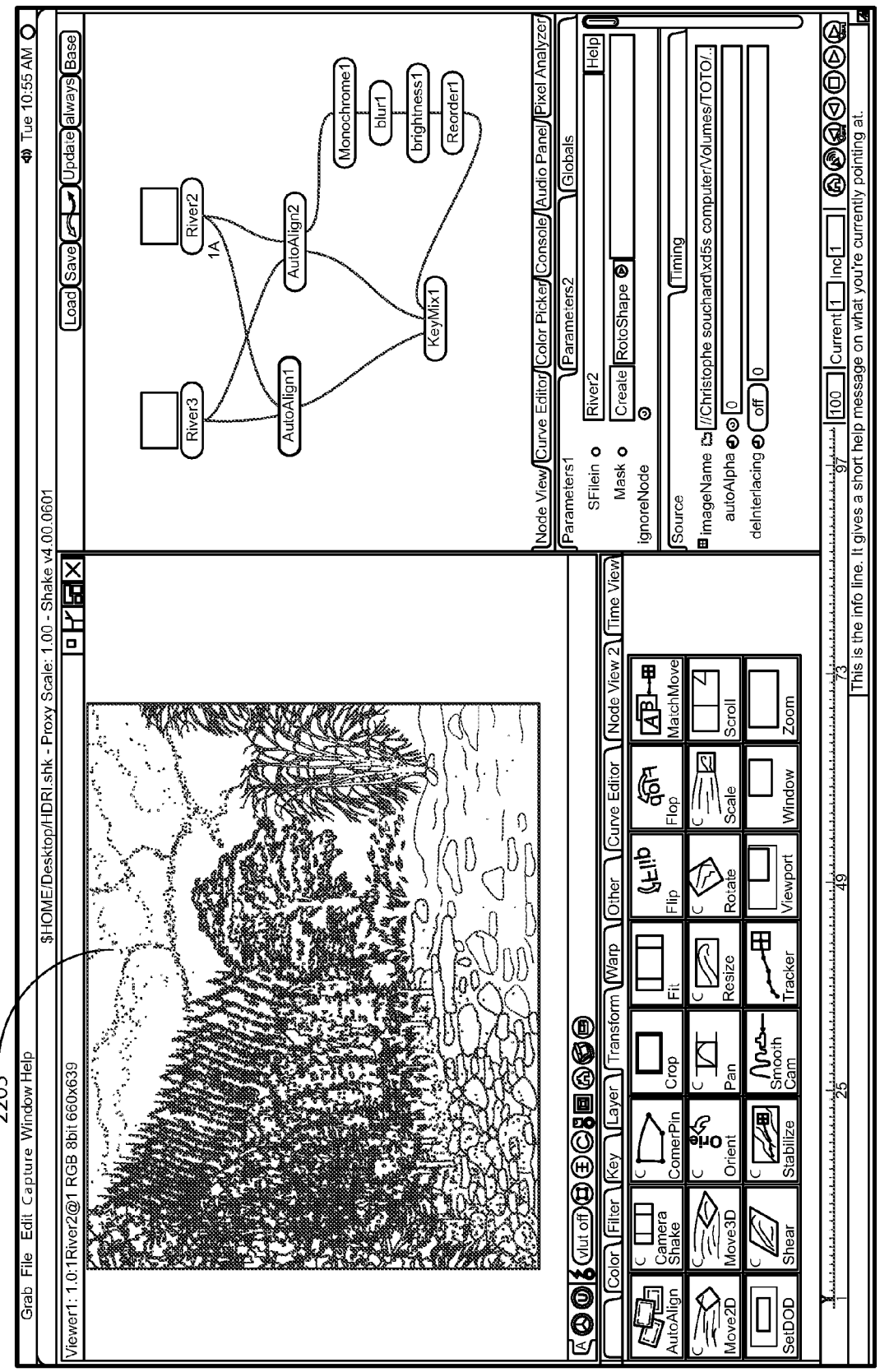
FIG. 22 illustrates an image that is underexposed.
Figure 23:
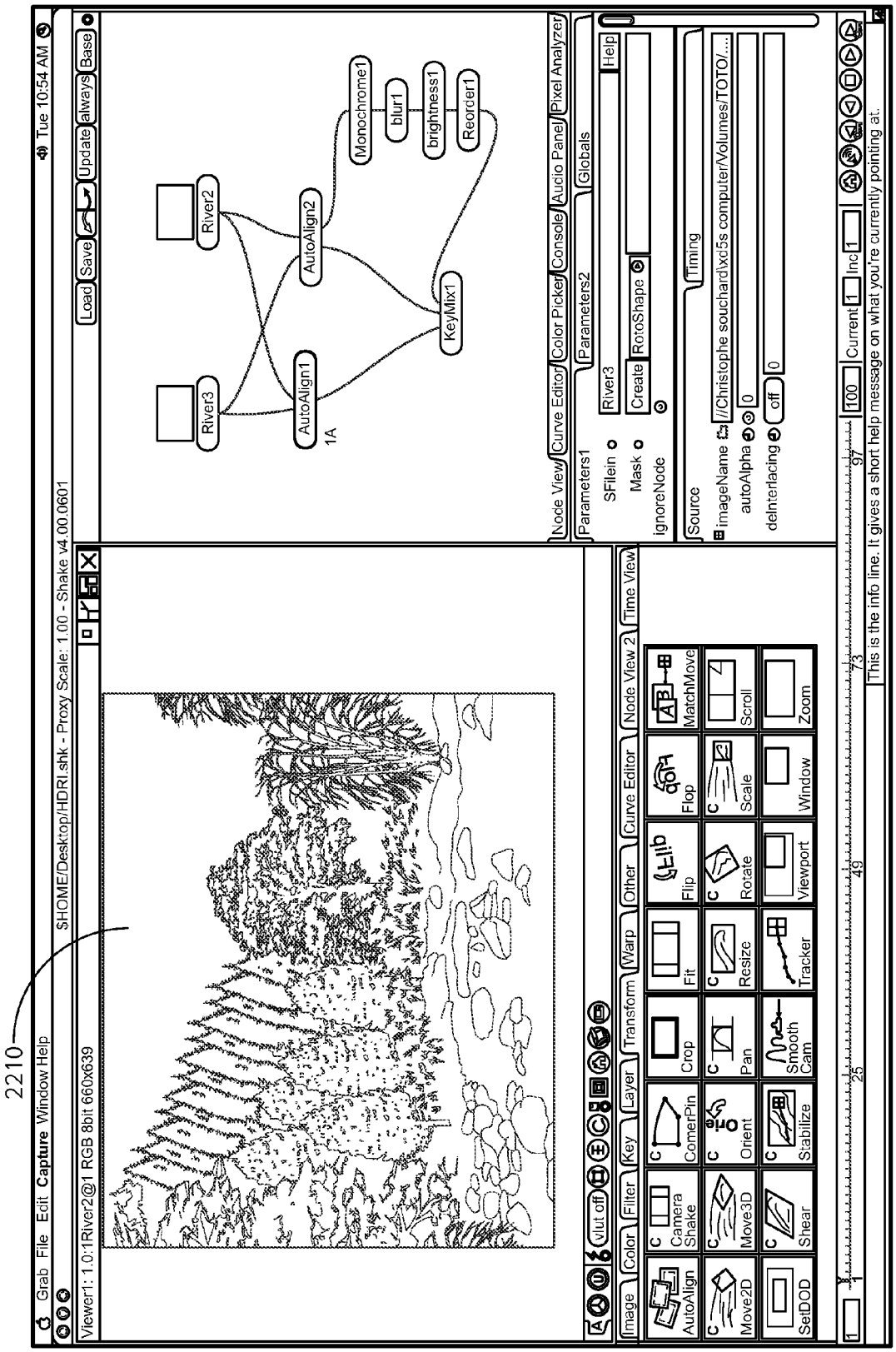
FIG. 23 illustrates an image that is overexposed.

The method 2100 selects (at 2110) the image that is underexposed. FIG. 22 illustrates an image 2205 that is underexposed. As shown in this figure, some of the regions and objects (e.g., trees, rocks, stream) in the image 2205 are too dark, while other regions (e.g., sky, clouds) have the right amount of exposure. In contrast, FIG. 23 illustrates an image 2210 that is overexposed (i.e., too much illumination). As shown in this figure, the sky has little or no detail, whereas the trees, rocks and stream are shown with detail.

After selecting (at 2110) the underexposed image, the method 2100 computes (at 2115) a monochrome, low pass version of the underexposed image. In other words, the method 2100 computes (at 2115) a blurred single color version (e.g., black, white) of the underexposed image. The image is blurred because the low pass filter blocks out the high spatial frequency (e.g., detailed) components of the underexposed image. In some embodiments, the low pass filter is a Gaussian filter.

Figure 24:
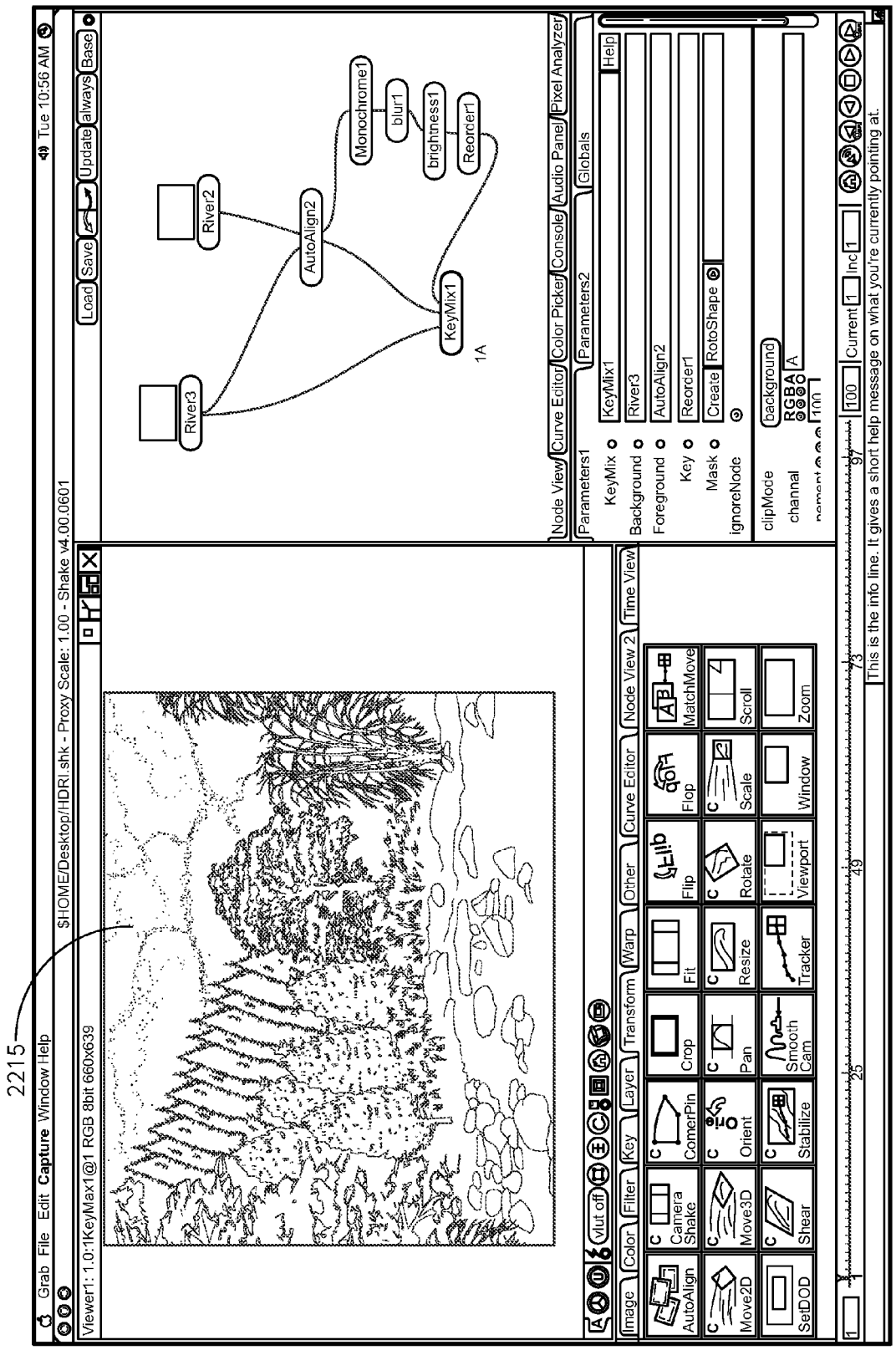
FIG. 24 illustrates an aligned high dynamic range image.

The method 2100 blends (at 2120) the first and second image by using the computed monochrome, low pass version of the underexposed image as a mask. FIG. 24 illustrates a high dynamic range image 2215 of the first and second images 2205 and 2210. As shown in this figure, certain regions in image 2210 that had no details, such as the clouds, are now shown with detail. In some embodiments, the exposure level of the high dynamic range image can be adjusted by changing a blend factor that weights the pixel values of the first and second images.

V. Computer System

Figure 25:
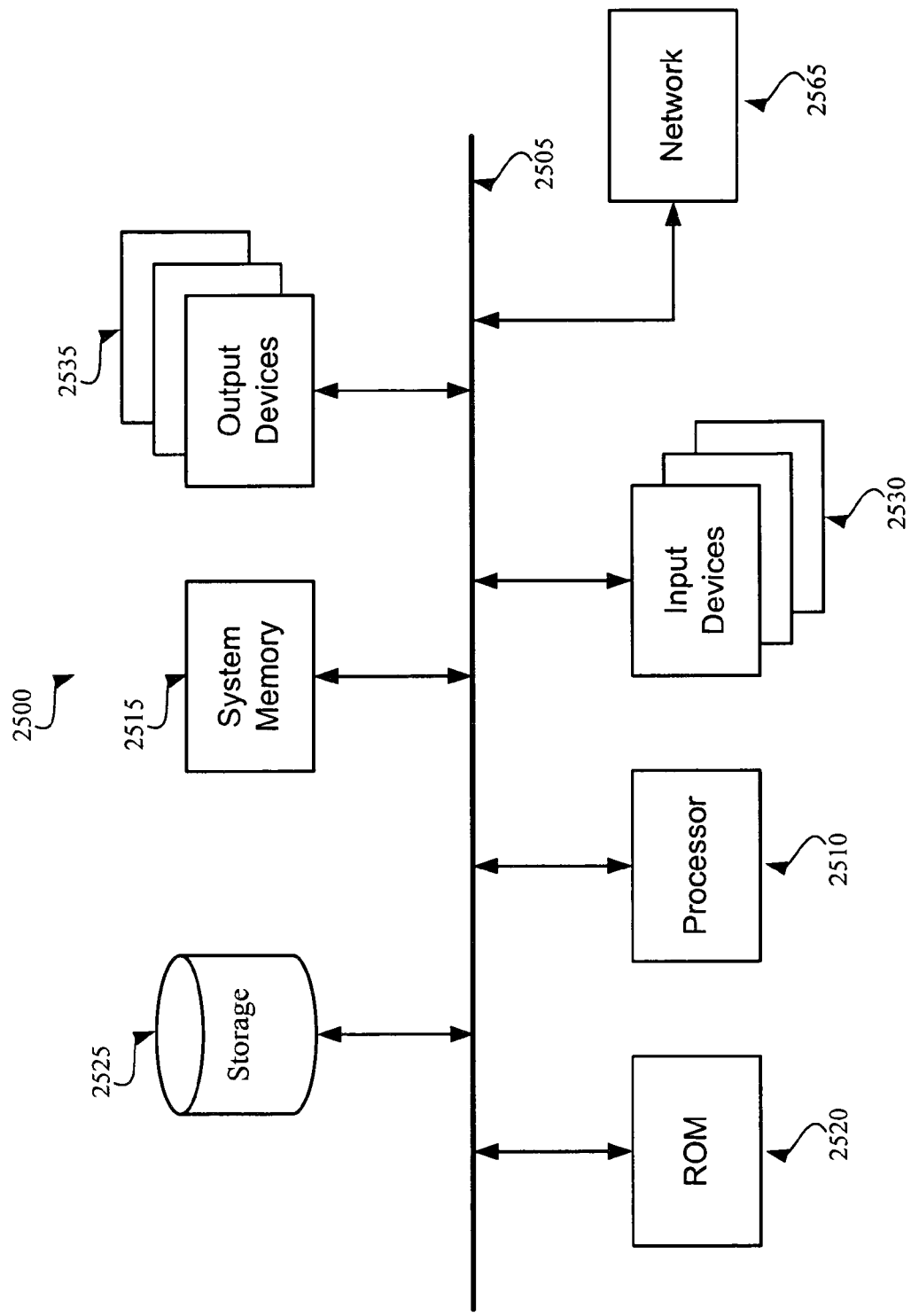
FIG. 25 illustrates a computer system that can implement the methods described.

FIG. 25 conceptually illustrates a computer system with which one embodiment of the invention is implemented.

Computer system 2500 includes a bus 2505, a processor 2510, a system memory 2515, a read-only memory 2520, a permanent storage device 2525, input devices 2530, and output devices 2535. The bus 2505 collectively represents all system, peripheral, and chipset buses that communicatively connect the numerous internal devices of the computer system 2500. For instance, the bus 2505 communicatively connects the processor 2510 with the read-only memory 2520, the system memory 2515, and the permanent storage device 2525.

From these various memory units, the processor 2510 retrieves instructions to execute and data to process in order to execute the processes of the invention. The read-only-memory (ROM) 2520 stores static data and instructions that are needed by the processor 2510 and other modules of the computer system.

The permanent storage device 2525, on the other hand, is read-and-write memory device. This device is a non-volatile memory unit that stores instruction and data even when the computer system 2500 is off. Some embodiments of the invention use a mass-storage device (such as a magnetic or optical disk and its corresponding disk drive) as the permanent storage device 2525.

Other embodiments use a removable storage device (such as a floppy disk or Zip® disk, and its corresponding disk drive) as the permanent storage device. Like the permanent storage device 2525, the system memory 2515 is a read-and-write memory device. However, unlike storage device 2525, the system memory is a volatile read-and-write memory, such as a random access memory. The system memory stores some of the instructions and data that the processor needs at runtime. In some embodiments, the invention's processes are stored in the system memory 2515, the permanent storage device 2525, and/or the read-only memory 2520.

The bus 2505 also connects to the input and output devices 2530 and 2535. The input devices enable the user to communicate information and select commands to the computer system. The input devices 2530 include alphanumeric keyboards and cursor-controllers. The output devices 2535 display images generated by the computer system. For instance, these devices display the GUI of a video editing application that incorporates the invention. The output devices include printers and display devices, such as cathode ray tubes (CRT) or liquid crystal displays (LCD).

Finally, as shown in FIG. 25, bus 2505 also couples computer 2500 to a network 2565 through a network adapter (not shown). In this manner, the computer can be a part of a network of computers (such as a local area network ("LAN"), a wide area network ("WAN"), or an Intranet) or a network of networks (such as the Internet). Any or all of the components of computer system 2500 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, some embodiments are implemented in one or more separate modules, while other embodiments are implemented as part of a video editing application (e.g., Shake® provided by Apple Computer, Inc.). Furthermore, the mask region is described during the alignment of video sequences. However, the mask regions can also be used during the creation off panoramic images and/or high dynamic range images. Thus, one of ordinary skill in the art will understand that the invention is not to be limited by the foregoing illustrative details, but rather is to be defined by the appended claims.

What is claimed is:

1. A non-transitory machine readable medium storing a computer program for a video editing application, the computer program for execution by a processor, the computer program comprising sets of instructions for:
   aligning an underexposed first video image and a second video image;
   generating a monochrome image of the first video image; and
   blending the first and second images by using the monochrome image as a mask to generate a high dynamic range video image.

2. The non-transitory machine readable medium of claim 1, wherein the computer program further comprises a set of instructions for transforming, before aligning the first and second images, one of said first and second images.

3. The non-transitory machine readable medium of claim 2, wherein the set of instructions for aligning the first and second images comprises a set of instructions for aligning the transformed image to the non-transformed image.

4. The non-transitory machine readable medium of claim 1, wherein the set of instructions for generating a monochrome image of the first image comprises a set of instructions for applying a low pass filter to the underexposed first image to create a blurred single color version of the first image.

5. The non-transitory machine readable medium of claim 1, wherein the second image is overexposed.

6. The non-transitory machine readable medium of claim 1, wherein the dynamic range is a range between a lightest region and a darkest region of an image.

7. The non-transitory machine readable medium of claim 1, wherein the set of instructions for blending comprises a set of instructions for changing a blend factor that weights pixel values of the first and second video images to adjust an exposure level of the high dynamic range video image.

8. The non-transitory machine readable medium of claim 1, wherein the set of instructions for generating a monochrome image of the first image comprises a set of instructions for applying, to the underexposed image, a low pass filter that blocks out high spatial frequency components of the underexposed image.

9. The non-transitory machine readable medium of claim 1, wherein the computer program further comprises a set of instructions for specifying a mask region to remove an uneven boundary when the first and second images do not completely overlap after aligning the first and second images.

10. The non-transitory machine readable medium of claim 9, wherein the mask region excludes a plurality of pixels of the first image from generation of the monochrome image.

11. A method comprising:
    aligning an underexposed first video image and a second video image, the first and second video images each comprising a plurality of pixel values;
    based on at least one of the first and second video images, generating a mask comprising a plurality of grayscale pixel values, each grayscale pixel value corresponding to a first pixel value of the first video image and a second pixel value of the second video image; and
    blending the corresponding first and second pixel values of the first and second images based on their corresponding grayscale pixel value to generate a high dynamic range video image.

12. The method of claim 11 further comprising, before aligning the first and second images, transforming one of said first and second images.

13. The method of claim 12, wherein aligning the first and second images comprises aligning the transformed image to the non-transformed image.

14. The method of claim 11, wherein generating a mask comprises applying a low pass filter to the underexposed first image to create a blurred single color version of the first image.

15. The method of claim 11, wherein the second image is overexposed.

16. The method of claim 11, wherein the dynamic range is a range between a lightest region and a darkest region of an image.

17. The method of claim 11, wherein blending further comprises changing a blend factor that weights pixel values of the first and second video images to adjust an exposure level of the high dynamic range video image.

18. The method of claim 11, wherein generating a mask comprises applying, to the underexposed image, a low pass filter that blocks out high spatial frequency components of the underexposed image.

19. The method of claim 11 further comprising specifying a mask region to remove an uneven boundary when the first and second images do not completely overlap after aligning the first and second images.

20. The method of claim 19, wherein the mask region excludes a plurality of pixels of the first image from generation of the mask.

* * * * *